(12) United States Patent
Bergeron

(10) Patent No.: US 9,067,132 B1
(45) Date of Patent: *Jun. 30, 2015

(54) SYSTEMS AND METHODS FOR INDIRECT CONTROL OF PROCESSOR ENABLED DEVICES

(71) Applicant: Archetype Technologies, Inc., Brookline, MA (US)

(72) Inventor: Bryan Bergeron, Brookline, MA (US)

(73) Assignee: Archetype Technologies, Inc., Brookline, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/912,771

(22) Filed: Jun. 7, 2013

Related U.S. Application Data

(63) Continuation-in-part of application No. 13/540,660, filed on Jul. 3, 2012, now Pat. No. 8,666,519, which is a continuation of application No. 12/503,471, filed on Jul. 15, 2009, now Pat. No. 8,239,047.

(51) Int. Cl.
  *G05B 15/00* (2006.01)
  *G05B 19/18* (2006.01)
  *G05B 11/01* (2006.01)
  (Continued)

(52) U.S. Cl.
  CPC ............ *A63F 13/00* (2013.01); *G05B 19/16* (2013.01); *A63F 13/02* (2013.01); *A63F 13/06* (2013.01); *G05B 15/02* (2013.01); *A63F 2300/69* (2013.01)

(58) Field of Classification Search
  CPC .. G05B 15/02; G05B 19/0426; G05B 19/042; G05B 19/16; G05B 2219/25428; G05B 19/409; G05B 19/0421; G05B 19/408; G06Q 50/22; G06Q 50/24; A63F 13/06; A63F 13/10; A63F 13/00; A63F 13/02; A63F 2300/69
  USPC ................ 700/83, 2, 11, 17, 20, 23; 436/47; 706/25

See application file for complete search history.

(56) References Cited

U.S. PATENT DOCUMENTS

| 4,716,804 A | 1/1988 | Chadabe |
| 5,286,907 A | 2/1994 | Okamura et al. |

(Continued)

FOREIGN PATENT DOCUMENTS

WO  WO 2005/101812  10/2005

OTHER PUBLICATIONS

Bonsor, K., "How Computer Clothing Works," HowStuffWorks, http://computer.howshiffsorks.com/computer-clothing.htm/printable, printed Feb. 16, 2009.

(Continued)

*Primary Examiner* — Kenneth M Lo
*Assistant Examiner* — Jason Lin
(74) *Attorney, Agent, or Firm* — Frost Brown Todd LLC

(57) ABSTRACT

Individuals can operate processor enabled devices at a high level of performance, even if they have little or no familiarity with those devices, by indirectly operating them through a first processor enabled device. The direct interactions of individuals with a familiar device can be communicated to one or more processors that perform signal processing functions in order to generate control signals that direct the operation of a second, unfamiliar processor-enabled device. In this closed-loop system, individuals can receive real-time feedback on the performance of the second device in a form associated with the operation of the first device.

17 Claims, 8 Drawing Sheets

(51) Int. Cl.

| | |
|---|---|
| *A63F 9/24* | (2006.01) |
| *G06F 15/18* | (2006.01) |
| *G06N 3/08* | (2006.01) |
| *A63F 13/00* | (2014.01) |
| *A63F 13/98* | (2014.01) |
| *A63F 13/20* | (2014.01) |
| *G05B 19/16* | (2006.01) |
| *G05B 15/02* | (2006.01) |

(56) References Cited

U.S. PATENT DOCUMENTS

| | | | | |
|---|---|---|---|---|
| 5,287,430 | A | 2/1994 | Iwamoto et al. | |
| 5,673,367 | A | 9/1997 | Buckley | |
| 6,069,567 | A | 5/2000 | Zawilski | |
| 6,157,724 | A | 12/2000 | Kawakami | |
| 6,766,025 | B1 | 7/2004 | Levy et al. | |
| 7,058,190 | B1 | 6/2006 | Zakarauskas et al. | |
| 7,491,123 | B2 | 2/2009 | Smith | |
| 7,729,818 | B2 | 6/2010 | Wheeler et al. | |
| 7,799,986 | B2 | 9/2010 | Ryle et al. | |
| 7,812,244 | B2 | 10/2010 | Kotton et al. | |
| 7,912,233 | B2 | 3/2011 | Takagi et al. | |
| 2002/0142834 | A1* | 10/2002 | Sobue | 463/30 |
| 2003/0149603 | A1 | 8/2003 | Ferguson et al. | |
| 2003/0171149 | A1* | 9/2003 | Rothschild | 463/42 |
| 2003/0222981 | A1 | 12/2003 | Kisak et al. | |
| 2004/0097288 | A1* | 5/2004 | Sloate et al. | 463/42 |
| 2004/0248071 | A1 | 12/2004 | Bedziouk et al. | |
| 2005/0286697 | A1 | 12/2005 | Bathurst et al. | |
| 2006/0090632 | A1 | 5/2006 | Ludwig | |
| 2006/0188250 | A1 | 8/2006 | Takeda et al. | |
| 2006/0223635 | A1* | 10/2006 | Rosenberg | 463/37 |
| 2006/0223637 | A1 | 10/2006 | Rosenberg | |
| 2007/0150081 | A1 | 6/2007 | Nixon et al. | |
| 2007/0189579 | A1 | 8/2007 | Crookham et al. | |
| 2007/0222294 | A1 | 9/2007 | Tsukida et al. | |
| 2008/0235237 | A1* | 9/2008 | Williams | 707/10 |
| 2010/0039514 | A1 | 2/2010 | Brand | |
| 2010/0292868 | A1 | 11/2010 | Rotem et al. | |
| 2012/0278439 | A1* | 11/2012 | Ahiska et al. | 709/218 |
| 2014/0162220 | A1* | 6/2014 | Rao et al. | 434/107 |

OTHER PUBLICATIONS

Card, O.S., Ender's Game, Tom Doherty Associates (1985).

Chebat, D.R., et al., "Navigation Skills in the Early Blind Using a Tongue Stimulator," Soc. Neurosci. Abstr. 2007.

Guitar Hero—Wikipedia, the free encyclopedia, http://en.wikipedia.org/w/index.php?title=Guitar_Hero&oldid=302094327, reflects revision as it appeared on Jul. 14, 2009 at 7:19 p. m., and printed Mar. 4, 2012.

Guitar Hero—Wikipedia, the free encyclopedia, http://wikipedia.org/wiki/Guitar_Hero, pp. 1-20, printed Jul. 16, 2009.

Johnston, A., et al., "Amplifying Reflective Thinking in Musical Performance," http://delivery.acm.org/10.1145/1060000/1056248/p166-johnson.pdf?key2=920643342&coll=GUIDE&CFID=37491886&CFTOKEN=31864637 (2007) pp. 166-175.

Jot, M., "Real-time spatial processing human-computer interfaces," http://www.springerlink.com/content/bj53d5u5uwd09pua/, 0942-4962 (Print) 1432-1882 (Online), vol. 7 (Jan. 1999).

Lifton, J.H., Dual Reality: An Emerging edium,; Ph.D. Theses MIT (2007) http://www.media.mit.edu/resenv/pubs/theses/lifton_phd.pdf.

Merrill, D., et al., "Personalization, Expressivity, and Learnability of an Implicit Mapping Strategy for Physical Interfaces," Proc. Of CHI 2005 Conference on Human Factors in Computing Systems, Extended Abstracts, ACM Press, Portland, OR Apr. 2-7, 2005)pp. 2152-2161.

Wozniewskim, M., et al., "A Spatial interface for audio and music production, " http://www.dafx.ca/proceedings/papers/p_271.pdf, (Sep.18-20, 2006) Proc. Of the 9$^{th}$ Int. Conference on Digital Audio Effects (DAFX-06) Montreal, Canada, pp. DAFX-271-274.

* cited by examiner

SYSTEMS AND METHODS FOR INDIRECT CONTROL OF PROCESSOR ENABLED DEVICES

CROSS REFERENCE TO RELATED APPLICATIONS

The present application claims the benefit of, and is a continuation in part of, co-pending U.S. non-provisional patent application Ser. No. 13/540,660, filed on Jul. 3, 2012, entitled "Systems and Methods for Indirect Control of Processor Enabled Devices," which is itself a continuation of U.S. non-provisional patent application Ser. No. 12/503,471, filed on Jul. 15, 2009, entitled "Systems and Methods for Indirect Control of Processor Enabled Devices." The disclosures of each of those applications are hereby incorporated by reference in their entireties.

BACKGROUND

1. Field

The present invention generally relates to human-machine interfaces. Specific embodiments can be used for leveraging innate and previously trained skills and abilities for high performance at operating novel devices with minimal training.

2. Related Art

Given the wide variety of tools available in modern society, learning to operate new devices is one of the most important activities in many people's lives. Unfortunately, there are many barriers to this type of learning. For example, learning to operate an unfamiliar device can require an individual to first cognitively grasp the operation of the device and then develop the requisite physical dexterity to operate the device. This is a problem both for individuals, who are forced to repeat the learning process for each new device, as well as for businesses, for whom ongoing employee (re)training is a significant and growing expense category.

One approach to dealing with modern society's profusion of devices is to focus on individualized training. There are a number of approaches which seek to make this individualized training more effective. For example, intelligent tutoring systems attempt to tailor the learning experience to the needs of individuals, thereby maximizing efficiency and effectiveness of learning. Similarly, there are a variety of systems that use virtual reality (either alone or in combination with real world interaction) in an attempt to train individuals by allowing them to mimic the operation of unfamiliar devices in simulation. For example, there exist flight simulators in which the flight controls and seat are bolted to a dynamic platform, which can provide real and simulated feedback that is appropriate and expected for a given maneuver. However, even using expensive virtual/mixed reality systems or advanced intelligent tutoring technology, this type of education-based approach still requires learners to cognitively grasp the operation of an unfamiliar device and then develop the manual dexterity to use it.

Another approach to dealing with the profusion of available devices is to map the inputs of one device onto another. An example of this is a modeling synthesizer. Modeling synthesizers in the music industry are a form of mixed reality system in which processor-enabled wind, keyboard, and string instruments serve as the primary user interface and the output is modeled on instruments that may bear no resemblance to the controlling instrument and with which the user may not be familiar. However, because the output of the modeling synthesizer does not take the form expected for the device the user is operating, the user must be skilled at interpreting the synthesized sound directly, and therefore cognizant of how their interactions with the processor-enabled instrument influence the output signal. For example, a user skilled at playing a keyboard may be able to use a keyboard-based synthesizer to create basic guitar string sounds, but lack to knowledge and skill required to use the keyboard synthesizer to create the sounds of a guitar string hammer-on and pull-off. Similar learning curve problems have been experienced with technology that is intended to allow users to compensate for injuries to their sense organs. For example, when video camera images have been translated to a grid of electrodes placed on the tongue, substantial training is required to enable blind individuals to interpret basic shapes. See Chebat, D. R., Rainville, C., Ptito, M. "Navigation Skills in the Early Blind Using a Tongue Stimulator" Soc. Neurosci. Abstr. 2007.

Among other benefits, aspects of the present disclosure can be used to enable individuals to operate unfamiliar devices while eliminating or reducing one or more of the drawbacks that characterize the prior art.

SUMMARY

This document comprises a disclosure of various techniques that can be used for purposes such as enabling individuals to achieve a high level of performance in the indirect operation of a device with which they have little or no training by directly operating a first device with which they are familiar and skilled. By directly operating a first familiar device, individuals cause a control signal to be generated that, by virtue of signal processing, directs the operation of a second, processor-enabled device. In this type of closed-loop system, individuals interacting with the first device are presented with real-time feedback in the form typical of that associated with the operation of the first device, but that is actually indicative of the operation of the second, unfamiliar device. Furthermore, the first and second devices need not share similarities in physical structure or underlying operation.

As will be apparent to one of ordinary skill in the art in light of this disclosure, the teachings of this disclosure can be utilized in a variety of different implementations. Set forth herein are certain features which some such implementations may include. It should be understood that the implementations identified herein are intended to provide examples only of aspects of implementations which could be created based on this disclosure, and are not intended to indicate limits on potential implementations which are covered by the claims in this document or any other documents claiming the benefit of this document.

BRIEF DESCRIPTION OF THE DRAWINGS

The drawings and detailed description which follow are intended to be illustrative and are not intended to imply limitations on the scope of potential implementations of the disclosure set forth herein.

DETAILED DESCRIPTION

Figure 1:
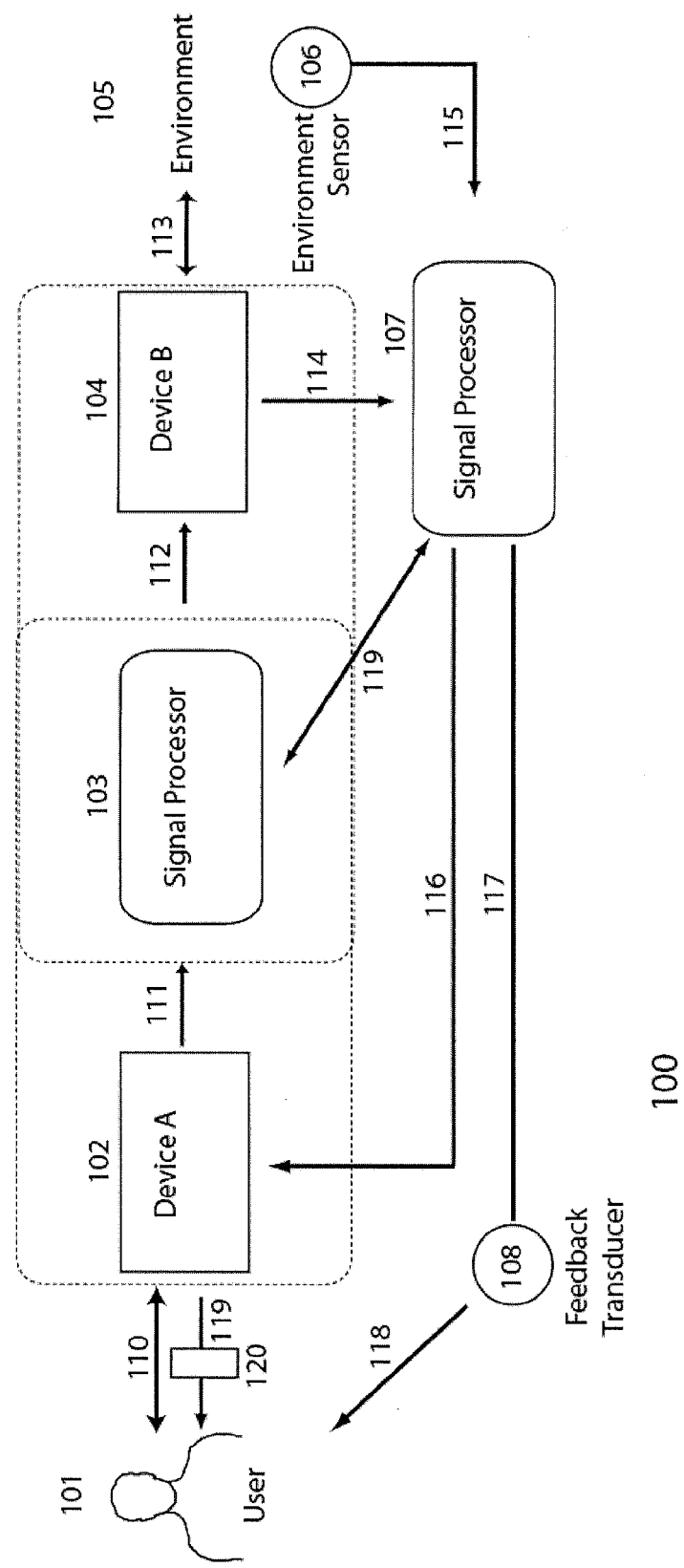
FIG. 1 depicts an exemplary generic high-level architecture which can be used to indirectly control a processor enabled device.

Turning now to the figures, FIG. 1 is an exemplary high-level architecture [100] of a system that could be implemented to enable a user [101] to indirectly control a remote device according to the teachings of this disclosure. In operation, one or more users [101] may directly manipulate or interact [110] with Device A [102], which, in some implementations, would be a device whose operation is familiar to the user(s) [101]. Device A [102] may consist of a single physical object or multiple, interconnected physical objects, each of which are considered part of a complete system. Device A [102] may comprise, for example, a video game console with a variety of attachments, including wireless controllers, speakers, audio amplifier, and video monitor. Another example of a multi-part Device A [102] is a TV with a wireless remote. In these two examples, the wireless controllers are considered part of Device A [102], and therefore contribute to the interaction [110].

As shown in FIG. 1, when the user [101] interacts with Device A [102], two types of feedback are generated. The first type of feedback, represented by the bidirectional arrow of interaction [110], is incidental feedback inherent in the operation of the device. The second type of feedback, represented by the unidirectional output arrow [119] is the characteristic output of the device. As a concrete illustration of the distinction between these two types of feedback, consider the case where device A [102] is an electric guitar. When a user [101] interacts with (i.e., uses) the electric guitar, the guitar will be expected to produce (and generally will produce) sound through an amplifier. This sound which is generally associated with the electric guitar is its characteristic output. The user [101] may also experience certain sensations other than the characteristic output [119] which exist simply by virtue of the nature of the electric guitar. These include, for example, the weight of the guitar, and the movement of its strings. Of course, it should be understood that this incidental feedback would likely differ between different device types, and may not be present at all in some instances. For example, if Device A [102] is a virtual or augmented reality guitar, then it may not have mass for the user [101] to sense, or its mass may be more or less than would be expected for a real instrument. Similarly, if Device A [102] were a steering controller attachment for a car race video game, it might present the user [101] with constant resistance to rotation, without the complex, nonlinear feedback inherent in the operation of a real car in a racing scenario.

In embodiments following the architecture of FIG. 1, when a user [101] interacts [110] with device A [102], the user [101] is generally exposed to the incidental feedback, but the characteristic output [119] may be completely or partially withheld. This may be accomplished by some type of isolation element [120] (for example, in the case where device A [102] is an electric guitar, the user [101] might be isolated from its sound by a set of headphones) or by using a modified version of the device which does not produce (or produces an attenuated version of) its characteristic output [119] (e.g., in the case of an electric guitar, the strings might be damped and there might not be a connection between them and an amplifier or speakers). In such a case, instead of, or in addition to, creating the characteristic output of device A [102], the user's [101] interaction produces an interaction signal [111] that is fed to the first signal processor [103]. This interaction signal [111] may originate from one or more sensors and one or more processors embedded within, attached to, or communicating with device A [102]. Furthermore, the interaction signal [111] can originate from the native signal output of the device, such as the analog audio output from the magnetic and/or piezo-electric transducers of an electric guitar, the analog or digital output of an EEG monitor, or the video signal from an analog or digital video camera. The interaction signal [111] may also originate from a post-processor associated with device A [102], such as an analog-to-digital converter, an analog-to-MIDI converter, an amplifier, compressor, or a noise limiter.

The first signal processor [103] may be stand-alone, or physically associated with device A [102] and/or the second processor-enabled device, device B [104]. The first signal processor [103] performs logic, transformation and mapping operations on the interaction signals [111] to generate control signals [112] to direct the operation of device B [104]. In some cases, these logic, transformation and mapping operations can be predefined (i.e., fixed at runtime), which can result in simplified testing and validation of the system, as well as greater certainty in the output given a specific interaction with device A [102]. In various embodiments, these interactions may be simple physical interactions, such as pressing a button or turning the knob of a volume control. They may also include physiological, biological, psychological, medical, perceptual, and physical measurement or assessment of the user and/or the environment. For example, device A [102] may have sensors for, and create signals representative of, color, pressure, temperature, speed, rate and degrees of rotation, volume, RBC count, hematocrit, blood glucose level, intensity, tone, frequency, viscosity, voltage, perfusion, elasticity, affect, alertness, rigidity, pulse rate, suppleness, luminance, humidity, and skin turgor, among others. For example, if device A [102] is a biofeedback device that produces light of a specific spectrum to reflect the user's brain activity, then the interaction signals [111] input to the first signal processor [103] reflect the frequency and amplitude of the user's EEG signals.

The output of the first signal processor [103], the control signal [112], is communicated from the first signal processor [103] to device B [104], which interacts [113] with its environment [105]. Examples of the interaction between device B [104] and the environment [113] include, but are not limited to, emission of light, RF, or other radiation, production of sound, applying a torque or pressure, electrifying, cutting, perforating, suturing, or other physical manipulation, as well as manipulations using forces at the atomic and sub-atomic levels. Examples of the environment [105] include, but are not limited to, free space, a semiconductor substrate, the atmosphere, submerged in water or other fluid, in a gas, in the abdominal cavity of a human or animal body, on a battlefield, in a vehicle, and inside a building. Examples of device B [104] include but are not limited to at least one real or mixed reality weapon system, drone, surgical robot, musical instrument, vehicle, aircraft, or physiologic monitor. In a preferred embodiment of the architecture of FIG. 1, device B [104] is an at least partially real processor enabled device.

The operation of device B can be monitored by its effect on its environment through an environment sensor [106] that communicates [115] with a second signal processor [107].

Device B [104] may also communicate directly [114] with the second signal processor. Whether the operation of device B [104] is monitored directly or from the environment, or both, depends on the nature of the interaction of Device B [104] with its environment [113] and whether device B [104] is capable of producing a signal [114] indicative of its operation (in addition to the requirements of a particular scenario, such as cost or space constraints). For example, if sub-optimal operation of device B [104] results in internal overheating, this elevated thermal signal may not be readily detectable by an environment sensor [106]. However, an internal thermistor or similar sensor could provide the basis for a timely overheating signal that could provide the basis for feedback to the user(s) [101].

The second signal processor [107] may share the same circuitry as the first signal processor, use different circuitry housed in the same physical unit, or take the form of a second, separate unit, with inter-unit communications [121]. This inter-unit communication [121] can be used to enable the synchronization of events in the two signal processors [103] [107] and the sharing of functions. This sharing of functions can be useful when the operations performed by the second signal processor [107] are the inverse of operations performed by the first signal processor [103]. It will be apparent to one of ordinary skill in the art in light of this disclosure that synchronization can be performed by a variety of established methods. For example, in the music studio, a world or master clock can be used to perform synchronization. Similarly, a common system clock can be used to synchronize input/output processing and thereby minimize latency. Of course, it should be understood that, even in embodiments where measures are taken to synchronize functions between different components, there may still be some residual latency in the system, as a function of sensor response times, the processing throughput or bandwidth of the signal processors, as well as the nature of the signal path in the environment. For example, a telesurgery system in which the controller and operating units are separated by thousands of miles will have a larger minimum latency compared with a telesurgery system located in one room and with a signal path of only a few meters. Similarly, in some circumstances, there may not be synchronization performed between elements (and there may not be inter-processor communications), for example, in implementations where the first and second signal processors [103] [107] are combined in a single physical unit. Accordingly, the discussion of the use of physically separate signal processors, as well as communication and synchronization between the same, should be understood to be illustrative only, and not limiting.

While there are many variations on how the teachings of this disclosure could be implemented, in embodiments following the architecture of FIG. 1, once the second signal processor [107] receives the signals [114][115] indicative of the operation of device B [104] according to the control signals [112], it performs logic, transformation and/or mapping functions on those signals to generate output signals [116][117] which can be communicated to device A [102] and a feedback transducer [108]. These output signals [116][117] can then be used to provide feedback to the user [101] which comprises output [119] in the form characteristic of the output of device A [102]. In some implementations following the architecture of FIG. 1 where the output is provided by device A [102] itself, this provision of feedback might include the isolation element [120] being configured to selectively let through feedback having the characteristic output type of device A [102] if that feedback is generated based on the output signals [116][117] (e.g., by having separate output connections on device A [102], by only allowing transmission of the feedback from the feedback transducer [108], or by some other means). Of course, it should be understood that such selective communication through an isolation element [120] might not be a feature of all implementations following the architecture of FIG. 1. For example, in cases where device A [102] is modified not to produce output of its characteristic type (e.g., an electric guitar with damped strings), the isolation elements might allow through all feedback having the characteristic output type of device A [102].

Of course, it should be understood that not all feedback provided to the user [101] will necessarily have the characteristic output type of device A [102]. In cases where device A [102] is incapable of providing feedback of sufficient amplitude, complexity, or fidelity to fully indicate the operation of device B [104], the feedback transducer [108] may be used to provide supplementary and/or reinforcing feedback [118]. For example, in one application, the feedback transducer [108] could be an audio amplifier and speaker unit to supplement a modest audio feedback signal [119] generated by device A [102]. In another application, the feedback transducer [108] could also take the form of a 3D virtual reality display that supplements the audio and hepatic haptic feedback [119] delivered by device A [102]. Further, in some embodiments, the output of device A [102] might be supplemented with output such as provided by device B [104] as a form of training enhancement. For example, in the case where device B [104] includes a real or simulated manual transmission system on a car, and device A [102] includes an automatic transmission. Instead of complex hand-foot coordination associated with operating a manual transmission, while listening to the engine, experiencing the forces of acceleration, and perhaps watching a tachometer and speedometer, the interface for device A [102] could present a much smaller amount of information, for example, an acceleration pedal, speedometer readings, and engine sounds. Such an embodiment might be programmed to gradually introduce elements of device B [104] (e.g., engine noise) into the feedback provided by device A [102] or the feedback transducer [108]. In this way, if/when the user [101] of the system was faced with directly operating device B [104], he/she would be familiar with the feedback elements of the device. In some cases it may also be possible that the feedback transducer [108] might provide additional output that enhances the output provided by device A [102]. It should also be understood that the examples given for devices which can be used to provide feedback to the user are illustrative only, and that other types of devices, such as a haptic mechanism, a constricting mechanism, a video projector, a vibrator, a voice synthesizer, a physiologic sound synthesizer, a nebulizer, a light synthesizer, a micromirror device, an electroactive polymer, a forced air generator, a fluid pump, a Peltier or other heater/cooler device, a muscle stimulator, an IV pump, and an implanted medical device could be used as well. As a result, the architecture of FIG. 1, as well as the accompanying discussion, should be understood as being illustrative only, and not implying limits on the scope of possible implementations of the disclosure set forth herein.

Figure 1A:
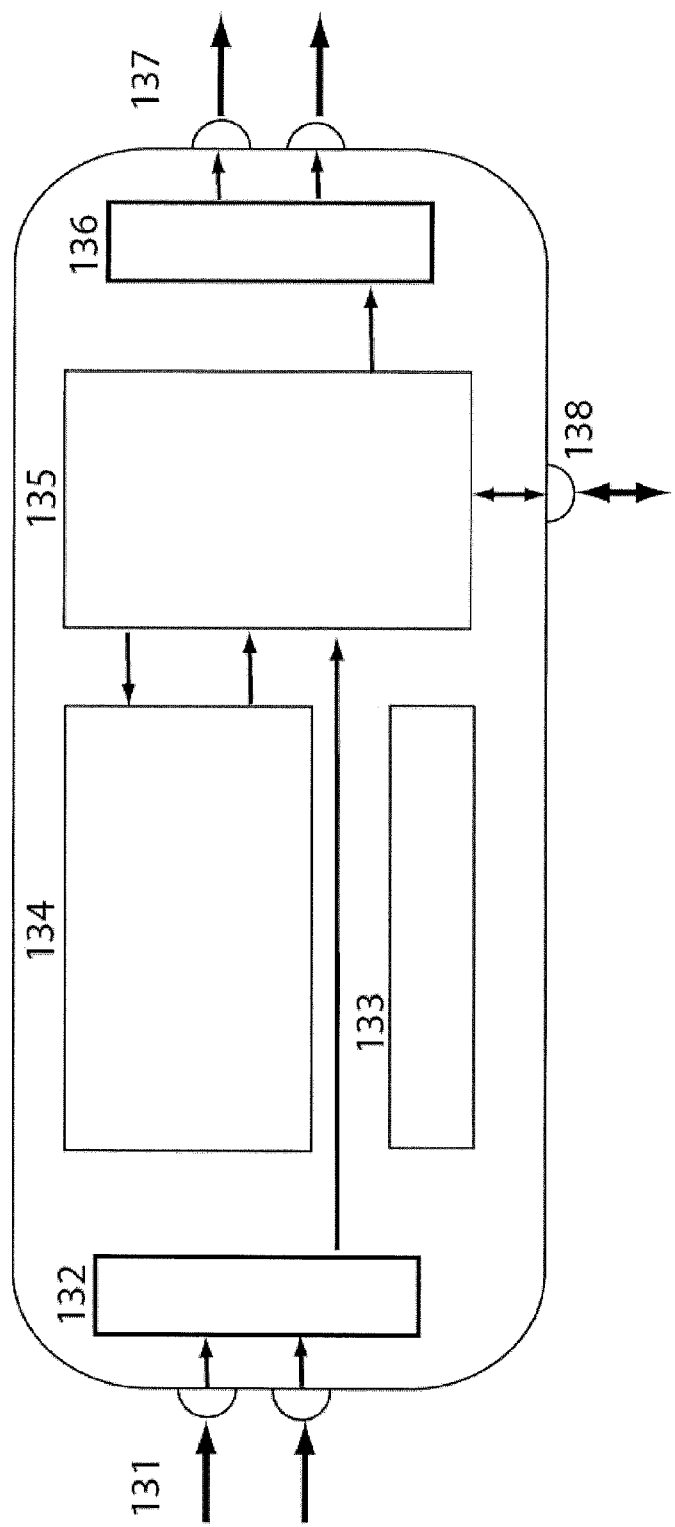
FIG. 1A depicts an exemplary high-level architectural scheme of a signal processor.

Turning now to FIG. 1A, that figure depicts an exemplary high level architecture of a signal processor such as could be used for the signal processors [103][107] depicted in FIG. 1. In the architecture of FIG. 1A, there are depicted one or more input connection(s) [131], an input interface element [132], a power supply [133], a data store [134], a processing element [135], an output interface element [136], at least one output connection [137], and a bidirectional communications link to a second signal processor [138]. As disclosed earlier, the first and second signal processors can be separate units, connected by a communications link for timing, program, and data exchange, as in this illustration. Alternatively, the first and second processor can be contained in one unit, in which case the communications link between signal processors would be contained within the unit, or might be eliminated altogether, depending on the overlap in circuitry and resources which may exist in a particular embodiment. As a result, it should be understood that the architecture shown in FIG. 1A is intended to be illustrative only, and that particular implementations might have fewer (or different) components than those shown in FIG. 1A, depending on the needs of a particular embodiment.

In an implementation following the architecture of FIG. 1, the input connection(s) [131] can be used to provide a hardware level interface with connectors appropriate to the input signal and its source. For example, the input connections [131] may comprise BNC, RCA, 13-pin MIDI, 9-pin serial, USB, Lightning, Firewire, XRL, DMX, CAN bus, digital optical or other types of signal connector. Similarly, the output connections [137] can employ various types of signal connectors as appropriate for the signal source, physical and electrical environment, length of cable run, cable type and dimensions, serviceability requirements, and related factors. Also, depending on the particular implementation, an embodiment of the architecture of FIG. 1A could use the power supply [133] to provide power for the input/output connections (in addition to, or as an alternative to, providing power for other elements, such as the processing element [135]). For example, if the output is USB, then the power supply [133] could provide standard 5V output. Similarly, if the input is an XRL connector and a condenser microphone will be used, then the power supply [133] could provide 48v phantom power. It is also possible that, depending on the implementation, the input [131] and output [137] connections could use wireless technology, such as Bluetooth, WiFi, ZigBee, or types of wireless communication technology. Combinations are also possible. For example, the input connection [131] may consist of a female USB connector, while the output [137] includes a wireless WiFi link to a nearby wireless access point.

In an architecture such as shown in FIG. 1A, the input and output connections [131][137] could be used for purposes such as communicating with other components (e.g., device A [102] from FIG. 1) and/or providing basic transformation and mapping for inputs and outputs. Similarly, the input interface element [132] could convert an input signal into a digital signal compatible with the processing element [135] through analog-to-digital and digital-to-digital conversion. Possible input signals to the input interface element include, but are not limited to, at least one of analog or digital video, audio, MIDI, RF, DC, AC, TTL signals, CAN bus, light, and PWM signals. In a preferred embodiment of an implementation of the architecture of FIG. 1A, the output to the processing element [135] is digital. The input interface element [132] could also provide for electrical isolation, impedance matching, and/or level normalization (i.e., amplification or attenuation). There are a variety of approaches which could be used in embodiments providing such features. For example, in a preferred embodiment, the input interface element [132] provides electrical isolation by employing optical couplers. Other approaches are also possible, such as transformer coupling the input signal or by using an RF or IR connection between signal source and the signal processor input, or other means known to those of skill in the art.

Continuing with the discussion of the architecture of FIG. 1A, in embodiments following that architecture, logic, transformation, and mapping functions used in indirectly controlling a device such as using the architecture of FIG. 1 can be according to instructions, such as those which could be expressed in the form of hardware, firmware or software which are executed by the processing element [135]. Given the variety of potential embodiments of this disclosure, there a number of different types of processing which the processing element [135] might be used to perform. For example, in an embodiment following the architecture of FIG. 1, the operation of device B [104] may be more complex, less complex, or of equal complexity to the operation of device A [102]. As a simple illustration, such a disparity in complexity may be reflected in the number of inputs and outputs supported by each device. Device B [104] may have three inputs, while device A [102] may have only one, i.e., there could be a one to many mapping. However, each device may have the same number of outputs, i.e., one-to-one mapping, but of different forms and amplitudes—thereby requiring translation. These various types of processing can be implemented using the form of fixed, declarative programs written in a scripting language, a compiled language, or the current state of an adaptive system e.g., a neural network, one or more of which could be reflected by information in the data store [134], instructions encoded in, or executed by the processing element [135], or a combination of the same.

Various types of data stores [134] and processing elements [135] could be used in different embodiments. For example, the processing element [135] could be implemented using a Field Programmable Gate Array (FPGA), a dedicated DSP chip, other general purpose controller, or a general purpose microprocessor, depending on the signal bandwidth and latency constraints. Programming language options include C, C++, and Assembler, among others. If a general purpose microprocessor is used, then a real-time operating system, such as RTLinux, would preferably be employed, though, obviously, different implementations might use different operating systems, or might forgo the use of an operating system entirely (e.g., certain implementations where the processing element [135] is implemented in special purpose hardware). The data store [134], if included in a system such as shown, could be implemented using an EEPROM, flash memory, ROM or other type of lookup table of values used by the processing element [135]. Of course, other variations are possible, depending on, for example, the processing power available from the processing element, and will be immediately apparent to those of ordinary skill in the art in light of this disclosure.

Once the control and/or output signals have been generated by the processing element [135], in some embodiments following the architecture of FIG. 1A, the output interface element [136] could be used to provide electrical isolation, impedance matching, level, and signal synthesis as appropriate for the device(s) fed by the signal processor. For example, if the output device requires a ¼ watt signal at 8-ohms impedance, then the output interface element [136] performs digital to analog conversion and delivers a ¼ watt at 8-ohm audio output signal. As per the discussion of the input interface element [132], it will be apparent to one of ordinary skill in the art in light of this disclosure that there are myriad standard methods available for providing the functionality of the output interface element [136].

In a preferred embodiment of the architecture of FIG. 1A, the processing performed by the processing elements [135], which in turn would control the mapping of the inputs and outputs of devices A and B in an embodiment following FIG. 1, would be determined prior to runtime. In such an embodiment, the processing could be defined by providing the user or system administrator with a mapping, translation, and logic utility, which would allow a non-programmer versed in the operation of devices A and B to adjust the mapping, translation and logic operations to suit individual or group requirements. A simplified example of such a utility is the pointing device utility with MacOs and Windows computers, which allows the user to change button mappings and motion sensitivity for a mouse or trackball to suit specific hardware and/or user needs. However, in some embodiments, runtime modification of processing might also be possible. For example, in a case where a user is seeking to indirectly control a device to complete a known task, a set of model feedback signals might be compared to the actual feedback signal [114] and/or used to train a neural network which is used to generate the control signals [112] based on the user's interaction signals [111]. Alternatively, desirable characteristics of the operation of the second device (e.g., if the second device is a musical instrument, desirable characteristics might include even tone) could be used in place of the model feedback signals when modifying the mapping during runtime.

Of course, it should be understood that the approaches described as being fixed at runtime, and the approaches with runtime modification are not mutually exclusive. For example, a learning approach such as using neural networks as described above could be used to create a static mapping, which would later be used in a product sold to consumers as a runtime fixed system. Similarly, it should be understood that neither the runtime fixed approaches, nor the runtime modifiable approaches are limited to being implemented using a signal processor such as shown in FIG. 1A. For example, in a runtime modifiable approach, there might be supplemental memory elements [134], or connections to external devices (not shown) which could store information such as the feedback signals, control signals, interaction signals, model training data and/or preferences, or other data. Similarly, in runtime fixed embodiments, an appropriate mapping might be burned into the processing element [135], and the memory element [134] might be omitted entirely. Accordingly, the discussion of the runtime fixed and the runtime modifiable implementations, as well as their relationship with the architecture of FIG. 1, should be understood as illustrative only, and not limiting.

Figure 2:
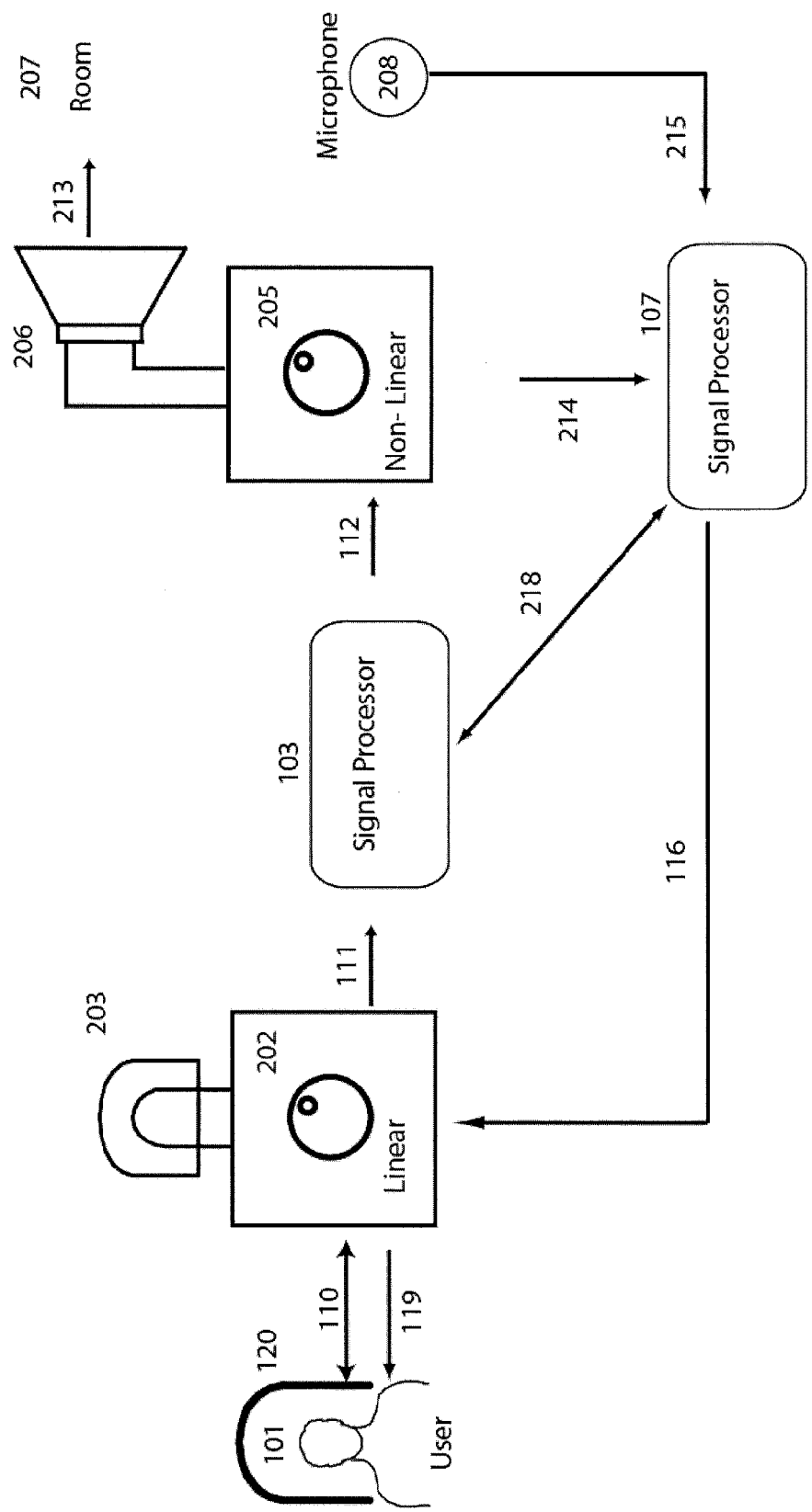
FIG. 2 depicts an exemplary high-level architecture which can be used in indirectly controlling a device though the use of a device with a dissimilar input profile.

Turning now to FIG. 2, that figure depicts a simplified architecture which can be used to demonstrate (in principle) how aspects of the technology disclosed herein can be used to allow a user to indirectly control a device which has a different interface and output type than the device operated by the user. In an embodiment following FIG. 2, one or more users [101] interact directly with a first device, which has an interface that consists of a single-turn linear control [202] (e.g., a control where the bulb's brightness increases linearly in direct proportion to the degrees of clockwise rotation of the control) and a light bulb [203]. When the user [101] rotates the control [202] an interaction signal [111] representing the position of the control knob [202] is sent to the first signal processor [103]. After signal processing, a control signal [112] is communicated to a second device which comprises a non-linear control [205] (e.g., a control where the closer the control is to a full clockwise position, the greater the relative change in sound intensity for a given rotation), which is used to adjust the amplitude of sound emanating from an attached speaker [206].

Once the control signal [112] reaches the second device, the sound emitted by the speaker [206] is modified according to the user's [101] interaction with the first device. The sound in the room [207] holding the speaker [206] is then picked up by a microphone [208] and the resulting signal [215] is transferred to a second signal processor [107]. Alternatively, the second device could communicate a signal indicative of the sound intensity produced [214] to the second signal processor [107]. The second signal processor [107] then generates an output signal [116] that is communicated to the first device and that defines the intensity of the attached light bulb [203]. Note that, in an architecture such as shown in FIG. 2, it may be possible that the output from the second device (i.e., the sound from the speaker [206]) could be detected by the user [101]. In such a case, the isolation element [120] could be used to screen that output from the user [101] so the only feedback the user [101] receives is the output [119] of the first device.

Of course, in practice, the use of sound, light and controls such as described with respect to FIG. 2 would likely be only a part of a larger assembly of varied interface controls which could indirectly control a second device. However, even the abstract example of FIG. 2 highlights potential advantages of the technology for users accustomed to differentiating light intensities and using a linear control knob. Similarly, the abstract example of FIG. 2 demonstrates the flexibility of the disclosed technology in terms of how the operation of a first device can be used to indirectly control a dissimilar second device. For example, in some implementations, it might be possible that, while the control [202] on the first device is being operated in a linear manner, the output [213] of the second device is changing in a non-linear manner (e.g., as the control [202] of the first device is rotated one degree clockwise, the control [205] of the second device would also be rotated one degree clockwise). In such a case, so that the first device would produce the expected output, the second signal processor [107] might transform the detected output of the second device into a linear output signal [116] (e.g., by translating the sound into a decibel level, as decibel level is a nonlinear type of measurement).

Alternatively, the first signal processor [103] could map the interaction signals [111] onto control signals [112] in such a manner that the output [213] of the second device changes in a linear manner as the control [202] on the first device is manipulated linearly (e.g., the degrees of rotation of the control [202] for the first device might be modified by a variable scaling factor based on how far the first device is from its minimum position in order to create the control signal [112] for the second device). In such a case, the second signal processor [107] could perform a relatively direct mapping between detected output and output signals [116] for the first device. How the actual mapping and translation will be performed in any particular embodiment will reflect the requirements of that embodiment's use. For example, in a case where it would be beneficial to have the second device perform in a manner which is difficult to obtain from the control [205] for the second device, but easy to obtain from the control [202] of the first device (e.g., in the example of FIG. 2, where a linear increase in sound intensity is required), then an approach which produces equivalent outputs will be preferable. Alternatively, in a case where the second device is one which is unfamiliar to the user [101], and the user [101] wants to leverage his or her existing skill with the first device, then it would likely be preferable to have an approach which produced equivalent controls.

Variations, such as where the output of the second device is mapped so that the feedback provided to the user is not a faithful reproduction of the user's operation of the first device (e.g., transforming the output of the light bulb [203] so that the control [202] of the first device essentially behaves in a non-linear manner), are also possible. Accordingly, the discussion of FIG. 2 and the related mapping should be understood as being illustrative only, and not limiting.

Figure 3:
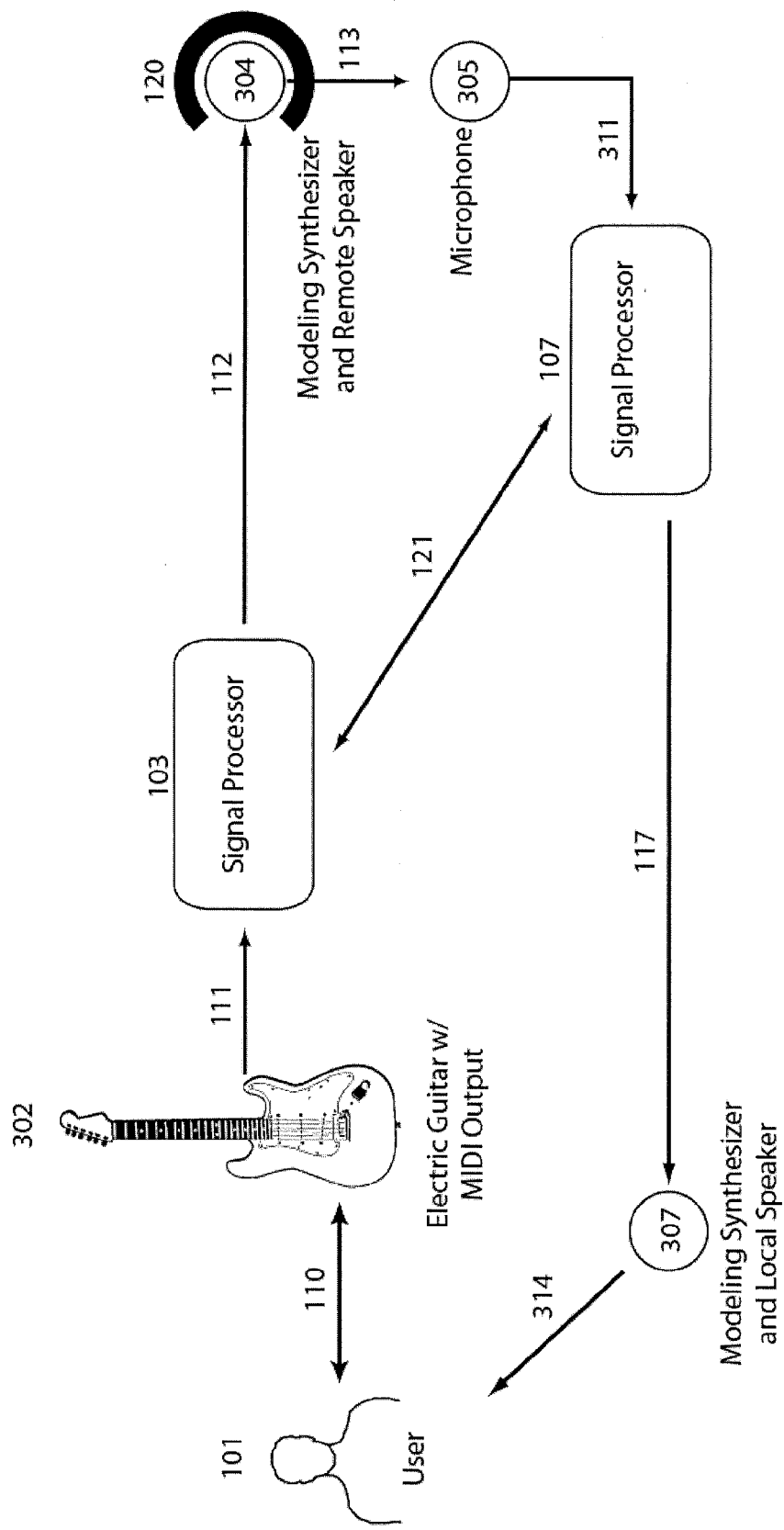
FIG. 3 depicts an exemplary high-level architecture which can be used to remotely control a modeling synthesizer.

Of course, the technology set forth herein is not limited to being implemented in such minimal systems as shown in FIG. 2. As an example of a somewhat more practical application of this disclosure, consider FIG. 3, which depicts an architecture that could be used in implementations where an electric guitar [302] is used to indirectly control a dissimilar modeling synthesizer and remote speaker [304]. In embodiments following such an architecture, the user [101], interacts with [110] an electric guitar [302] that is configured with a standard onboard MIDI interface. When played, the guitar [302] generates an interaction signal [111] (e.g., a MIDI signal) that is sent to the first signal processor [103]. The first signal processor [103] then generates a control signal [112] which is communicated to a modeling synthesizer and speaker [304] that is configured to synthesize sounds of, for example, a wind instrument. In a configuration such as shown in FIG. 3, the output [113] of the synthesizer [304] is shielded by an isolation element [120], which prevents that output [113] from being directly perceived by the user [101], while still allowing it to be detected by a microphone [305] (e.g., the isolation element [120] could be an acoustically isolated room, and the microphone could have a pickup located inside the room to detect the output [113] of the synthesizer [304]). The microphone [305] detects and digitizes the sounds (e.g., wind instrument sounds) emitted by the remote speaker and the digital signals [311] are sent to a second signal processor [107], which performs logic, transformation, and/or mapping functions on the data to derive an output signal [117]. The output signal [117] is communicated to a modeling synthesizer [307] and local speaker, providing the user [101] with local feedback [314] in the form the user expects from the guitar [302]. For example, if the user [101] of the guitar [302] executes a known series of movements, such as a hammer-on followed by a pull-off, on a given string, as dictated by sheet music or tablature designed for the purpose of controlling the modeling synthesizer [304], then the user [101] is made aware of the quality of his performance by listening to the guitar notes produced by the modeling synthesizer and local speaker [307].

It should be understood that there is a variety of methods of driving a modeling synthesizer from an electric guitar, involving, for example, both wired and wireless communications, and that implementations of this disclosure are not limited to any particular approach. Similarly, possible configurations of the modeling synthesizer and local speaker [307] include a clamp-on sensor bar and associated MIDI conversion circuitry that attaches to the guitar [302] body, and fully self-contained units in which the modeling elements are within the guitar [302] body. Similarly, the microphone sensor [305] can be implemented in a variety of manners, and may to encompass a microphone transducer proper and associated amplifier, phantom power source, and other electronics typically associated with live or studio audio capture.

Figure 4:
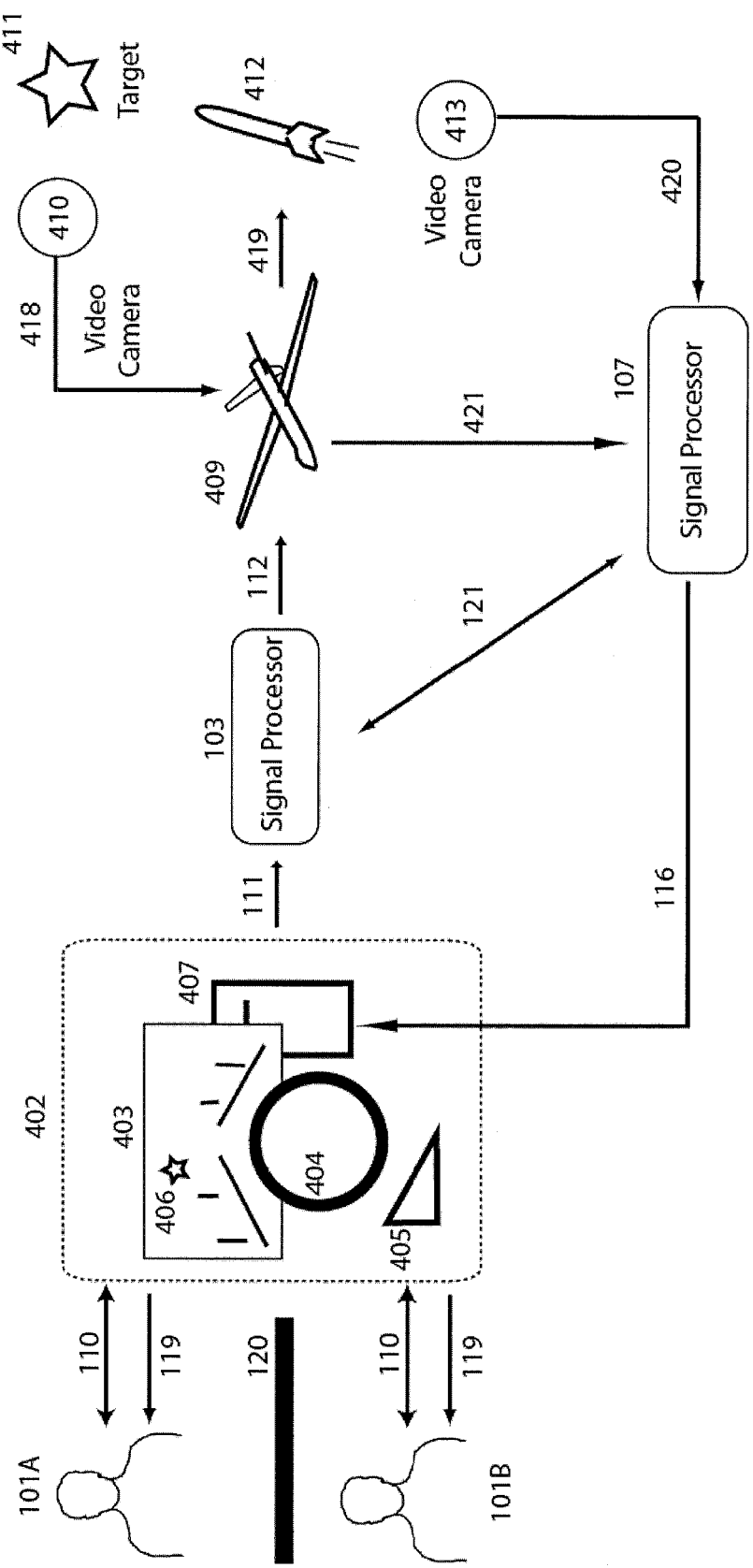
FIG. 4 depicts an exemplary high-level architecture which can be used for remotely controlling unmanned aircraft.

FIG. 4 depicts an exemplary high-level architecture in which aspects of the teachings of this disclosure are applied to a video game [402] and a remotely controlled aircraft or drone. At least one user [101A][101B] interacts [110] with a video game [402] modeled after a familiar driving game. In an embodiment following the architecture of FIG. 4, the game hardware can comprise of a variety of ordinary PC or game console interface peripherals, including a speed pedal [405], a steering wheel [404], a monitor [403], and a handheld, laptop, tablet, smartphone or desktop computer or dedicated game console [407].

User interaction [110] with the hardware and software constituting the game generates an interaction signal [111] that is communicated to a first signal processor [103]. The output of this signal processor [103] is a control signal [112] which is communicated to a remotely controlled aircraft [409]. This control signal [112] could control a variety of parameters for the remotely controlled aircraft [409], such as motor speed, configuration of the control surfaces of the aircraft, and other aspects of the craft relative to flight, take-off, and landing. Further, in the illustrated architecture of FIG. 4, the user(s) [101A][101B], through interacting [110] with the game [402], could also define the positioning of an onboard video camera [410] in searching for targets [411] for, in this example, photo reconnaissance or destruction. For photo reconnaissance, data from the video camera [410] (e.g., an onboard video camera for the aircraft [409]) could be communicated to the aircraft [409] and from the aircraft [421] to the second signal processor [107], which might also be stored on the aircraft [409].

While the above discussion focused on a video camera [410] and signal processor [107] which were physically located on the aircraft [409], it is not a requirement for embodiments following the architecture of FIG. 4 that those components be combined. For example, in some implementations, there might be a second camera [413] located on a drone accompanying the aircraft [409] in communication [420] with the second signal processor [107]. That second camera [413] could be used to collect images of the target [411] and the aircraft [409], as well as other information, such as the surrounding environment. In such an implementation, which includes an accompanying drone, the second signal processor [107] may also be located on the accompanying drone, rather than on the aircraft [409]. Of course, other locations are also possible (e.g., a support drone or base, where the aircraft and the accompanying drone have relatively weak transmitters that transmit signals to the support drone for processing and further transmission), and so the discussion of the second camera [413] and the potential accompanying drone should be understood as being illustrative only, and not limiting.

However, regardless of how the various cameras [413] [410] in an embodiment of the architecture of FIG. 4 are disposed, in embodiments following that architecture, their output would be used by the second signal processor [107] to create an output signal [116] which would be sent to the video game [402] to provide feedback [119] to the users [101A] [101B]. The video game [402] displays target information [406] in a familiar form, and reflects parallel activities performed by the remote aircraft [409] based on the control signal [112]. For example, in some implementations, firing on the target in the game [402] could be mapped to triggering either processing the video feed for reconnaissance or firing [419] a missile [412]. In this type of implementation, what appears on the video game display [403], and is therefore presented [119] to the user(s) [101A][101B] could depend on the success of the real missile [412] destroying the real target [111] (perhaps as determined by a video camera [410] or, in photo reconnaissance mode, of capturing a photo of the target [411]. In the event the signal processors [103][107] are physically separate, a communications channel [121] between the two processors could be used to provide for timing and function sharing. Similarly, the capabilities and functions of the two signal processors [103][107] could vary with the requirements of a particular embodiment. For example, if targets of a specific configuration must be automatically identified in images from the onboard and external cameras (i.e., image recognition) and the targets mapped onto a 3D space within a video game, then the processing could be significant. In contrast, if video is simply fed from the video cameras onto the screen of the game console with only modest filtering or spatial reconstruction, requiring the user to perform pattern recognition, then the burden on the signal processors is lessened, and less expensive/powerful signal processors could be used.

It should be understood that, while the discussion above focused on using an architecture such as shown in FIG. 4 to indirectly control a remote aircraft [409], it is possible that such an architecture could be used for other purposes as well, such as training a user to operate equipment which is unfamiliar. For example, the video game [402] depicted in FIG. 4 could be a simulator for a type of remote aircraft that the user is already familiar with. In such a case, the user's interaction with the simulation could be converted into control signals for a second type of remote aircraft which is unfamiliar to the user. The feedback provided to the user would then be determined by the actual operation of the unfamiliar remote aircraft (or a simulation of the same) as described previously. However, the simulation provided to the user might be configured so that the simulation would gradually transition from the output associated with the familiar type of remote aircraft, to the output associated with the unfamiliar type of remote aircraft (e.g., the type and responsiveness of the controls presented to the user might be altered). Similarly, the output provided by the simulation might be gradually transitioned from the familiar type of remote aircraft to the unfamiliar type (e.g., field of vision and resolution of acquired video data might change). In this way, the technology described herein could be used as a training tool for unfamiliar remote aircraft (or other types of devices) which would allow a user to become competent with operating the remote devices directly.

As another example of a variation on the discussion above, in some implementations it might be possible that the combined efforts of multiple users [101A][101B] might be used to control a remote aircraft [409]. For example, in as shown in the architecture of FIG. 4, the multiple users [101A][101B] might each control a driving game [402] which (after appropriate signal processing) provides the control signal [112] for operating the remote aircraft [409]. In such a case, it might be that the users [101A][101B] would operate physically separate instantiations of the driving game [402], and the interaction signal [111] for the first signal processor [103] would be a combination of the inputs [110] of the first and second users [101A][101B]. Another approach could be where the first and second users [101A][101B] could operate different interfaces (e.g., the game [402] from FIG. 4) to control different aspects of the remote aircraft [409]. For example, the first user [101A] could operate a driving game, the output from which would be used to generate aspects of a control signal [112] that would control the remote aircraft's navigation. Simultaneously, the second user [101B] could operate a fixed path first person shooter game (i.e., a game where the player controls the operation of a weapon, while the movement of the character is performed automatically), the output of which could be used to generate aspects of a control signal [112] that would control the remote aircraft's reconnaissance/weapons systems. In such a case, while the individual players [101A][101B] might not be aware of one another (e.g., they could be isolated by an isolation element [120], such as a visually and acoustically opaque wall between two rooms) their combined operation of the remote aircraft [409] might be reflected on both of their games. For example, in the case of a drone controlled by a combination of driving and shooter interfaces, the navigation of the drone (which is determined by the driving interface) would be reflected in both the progression of the driving game and the path taken in the shooter game. Similarly, the operation of the reconnaissance/weapons systems (which is controlled by the shooter interface) could be reflected both in the score of the race game (e.g., hitting checkpoints) and the second user's ability to eliminate enemies in the shooter.

In yet another approach, multiple users [101A][101B] could operate the same aspects of one or more remote devices. For example, a first user [101A] could use a first device (e.g., a driving game) to direct a group of remote aircraft to follow a pre-determined flight path (e.g., over multiple targets of interest). One or more second users [101B] could use a second device (e.g., a dodging/fighting game) to control the specific movements of the individual remote aircraft. For instance, the first user's operation of the first device could establish a target position (e.g., if the first user turned left in a driving game, then the target position would also move to the left). The second users [101B] could then score points for staying close to the target (e.g., keeping focus on a simulated fighter) and lose points (or lose the game) for failing to avoid obstacles (e.g., dodging punches). This type of embodiment could be useful in cases where two different skill sets are required (e.g., strategic thinking to follow an overall course+ tactical thinking/reflexes to avoid obstacles along the way) and it is easier to train multiple individuals in individual skill sets than a single individual in multiple skill sets. Of course, it should be understood that this embodiment, as well as the other embodiments disclosed herein, is illustrative only, and should not be treated as implying limitations on the potential uses for the technology disclosed herein.

Figure 5:
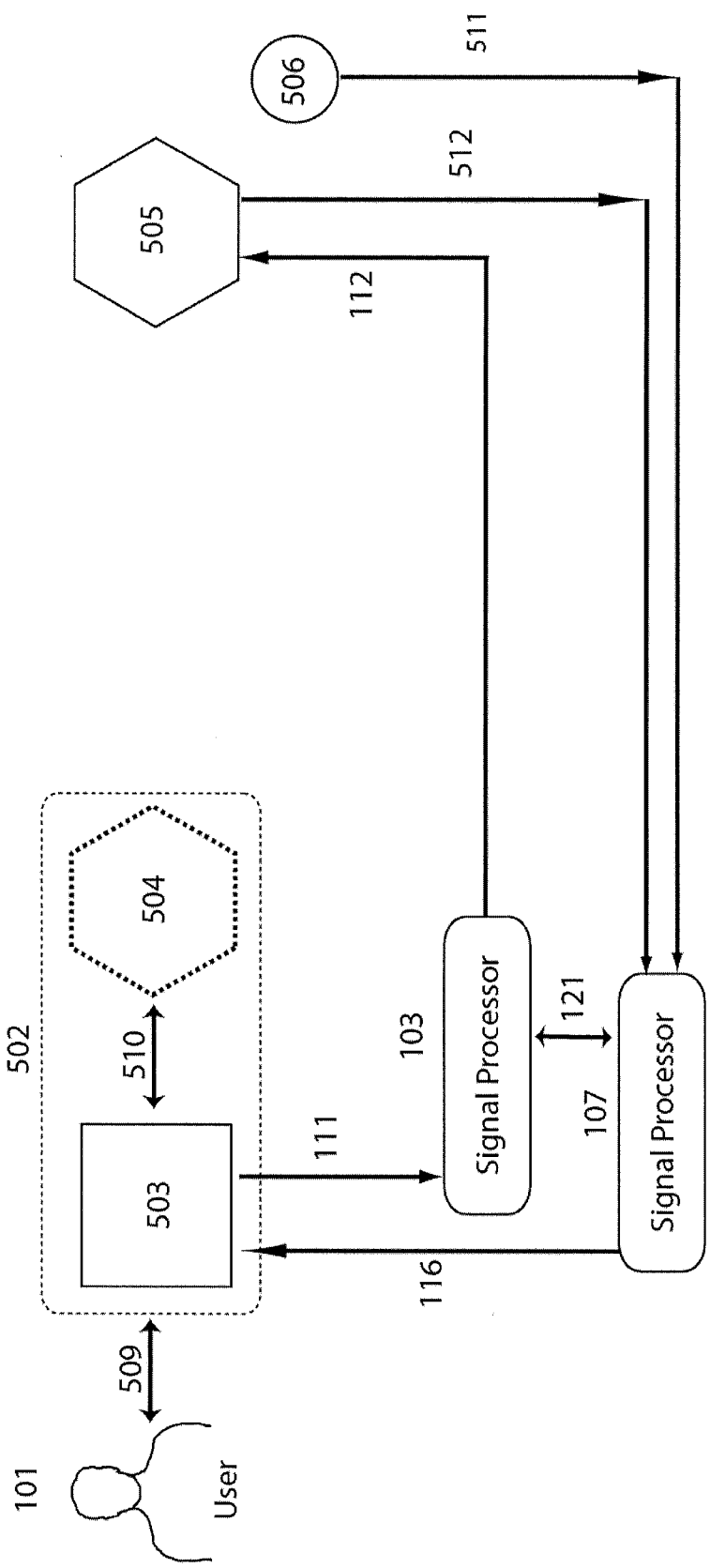
FIG. 5 depicts an exemplary generic high-level architecture which can be utilized in indirect control of robots.

Moving on from the discussion of FIG. 4, FIG. 5 depicts an exemplary generic high-level architectural scheme in which certain aspects of the disclosed technology can be applied to a first and second robot. By way of example to illustrate the architecture of FIG. 5, the following discussion is set forth in the context of remote surgical robots. Using an architecture such as shown in FIG. 5, one or more users [101] could interact [509] with a first surgical robot control unit, [503], the local module of a two-part surgical robot [502]. In the standard configuration, user(s) [101] would interact directly with the local controller, which would communicate [510] with a remote surgical unit [504]. The remote surgical unit [504] would in turn operate on a patient (not shown) according to the user's [101] commands. However, using the techniques set forth herein, instead of controlling the remote surgical unit [504], the user's commands would be sent to a first signal processor [103], and would be translated by that signal processor [103] into control signals [112] which would be communicated to a second remote surgical unit [505] which might, under ordinary circumstances, be controlled by a second type of control unit (not shown). This could be useful in cases where there is a surgeon who is skilled in the operation of the first surgical control unit, but not in the operation of the second unit. For example, the first unit could include a set of feedback gloves, while the second unit might operate by a joystick interface. Other types of differences between the first and second control units are also possible. For example, the second control unit could differ from the first control unit in terms of complexity, the number of actuators that can be accessed by each control, the granularity of control, number of degrees of freedom controllable for each actuator. The first control unit could hide some of the complexity of the first unit by automating some control tasks, such as tool selection. The first control unit could also enhance the resolution and/or fidelity of the feedback presented to the user, over what the second unit presents. The result would be easier control of the second surgical unit as well as the possibility of controlling multiple second surgical units simultaneously.

In any case, feedback from sensors in the remote surgical unit [512], as well as signals [511] from one or more accessory sensors [506] would be fed to the second signal processor [107], which would create an output signal [116] which would provide feedback to the user [101] in the form associated with the first remote surgical robot [504]. As will be apparent to one of ordinary skill in the art, the number, nature and placement of the accessory sensor(s) [506] depends on the sensors available in the second remote surgical unit [504] relative to the sensors expected by the first surgical robot control unit. For example if the first control unit enables the operator to assess real-time tissue perfusion by providing an optional IR view of the surgical field, and the second surgical unit is equipped with video cameras that respond to only visible light, then an IR camera would be an accessory sensor. Similarly, if the first control unit supports IR imaging in stereo, then two IR cameras could be installed at location of the second control unit, with the angle and orientation determined by the needs of the stereo display in the first control unit.

Of course, it should be understood that the description of FIG. 5 in the context of remote surgical robots is intended to be illustrative only, and that variations on the application discussed above could be implemented based on the disclosure set forth herein. For example, instead of mapping between dissimilar remote surgical units, the architecture of FIG. 5 could be used to map commands from an input device that is not related to surgery into commands for a remote surgical unit (or other type of robot). As an illustration, consider a remote military vessel or installation in which an individual untrained in surgery is required to direct a surgical robot in order to save a fellow crewman. Using an architecture such as discussed with respect to FIG. 5, the untrained individual could direct a surgical robot by interacting with, for example, an instrumented version of a familiar video game or other device. Similarly, consider a scenario in which surgical robots and similar remotely controlled medical devices are mass produced for use near an active battlefield, site of an earthquake, or a bomb detonation in urban area. Using an architecture such as depicted in FIG. 5, military medics, civilian first responders, and other individuals with minimal knowledge of surgical and related medical techniques could direct the surgical robots and other medical devices by directly interacting with, for example, standard PC controllers and familiar applications that have no direct relation to surgery or medicine.

Figure 6:
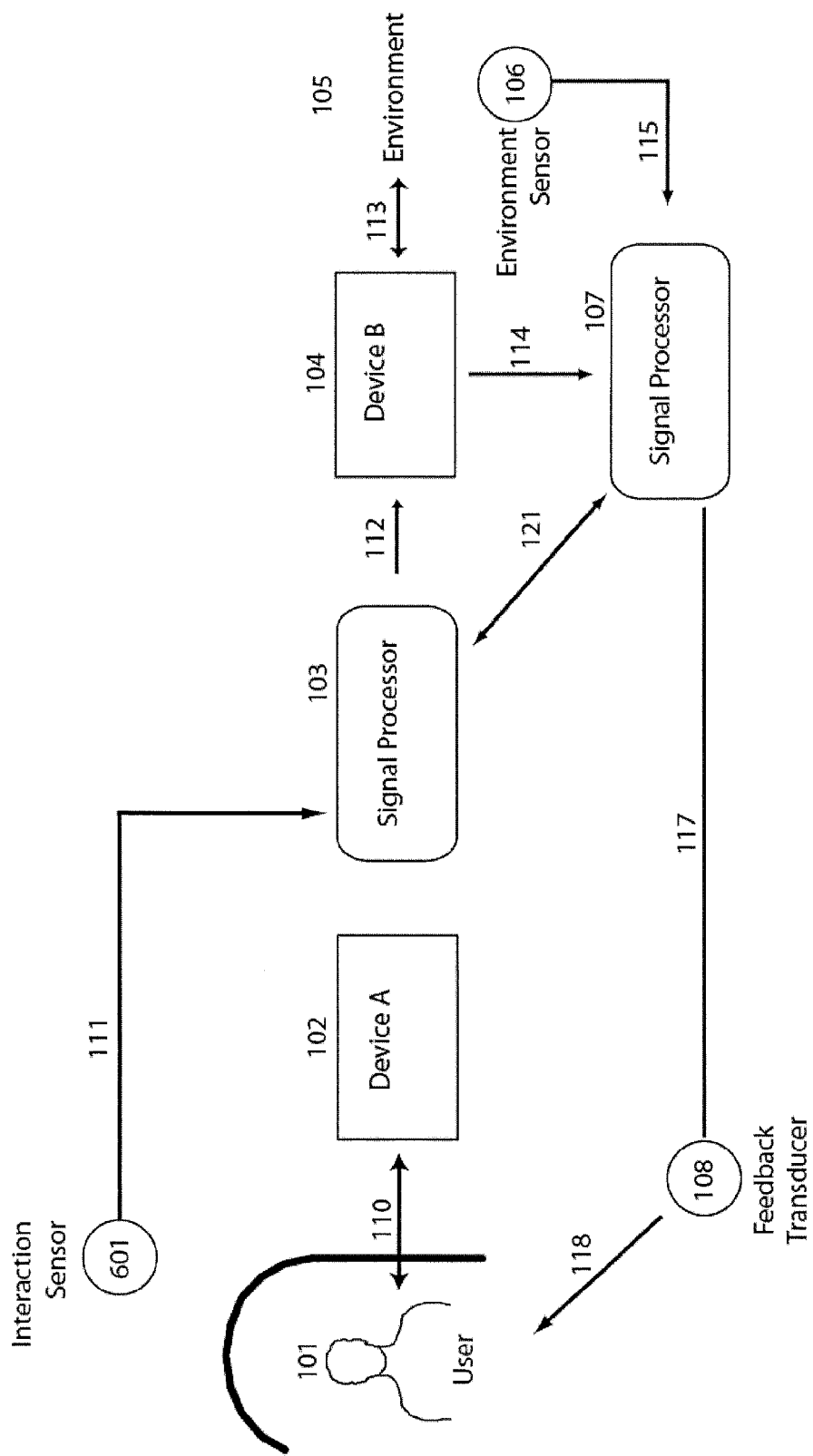
FIG. 6 depicts an exemplary generic high-level architecture in which a user's interaction with a first device is captured by an interaction sensor.

It should also be understood that variations on the architecture of FIG. 5 (as well as those from FIGS. 1-4) are not limited to variations in the devices used in specific implementations, or how specific implementations could be deployed in practice. Instead, it should be understood that systems having different flows of information and control could also be implemented by those of ordinary skill in the art without undue experimentation in light of this disclosure. As an example of this, consider the architecture depicted in FIG. 6. In FIG. 6, as in FIG. 1, a user [101] interacts [110] with a first device [102]. However, while in FIG. 1 the first device [102] was instrumented so as to produce interaction signals [111] to be sent to the first signal processor [103], in the architecture of FIG. 6, the interaction signals [111] are generated by an interaction sensor [601], which detects the effects of the user's interaction with the first device [102] by monitoring the surrounding environment. For example, in the case where the first device [102] is an electric guitar, the interaction sensor [601] could be a microphone which would detect the user's operation of the guitar, and use that information to generate the interaction signals [111]. Other variations are also possible. For example, there could be implementations which combine the architectures of FIGS. 1 and 6, so that the figure signal processor [103] combines interaction signals [111] sent by both the first device [102] and the interaction sensor [601] into a single control signal [112] which is used to drive a second device [104].

Figure 7:
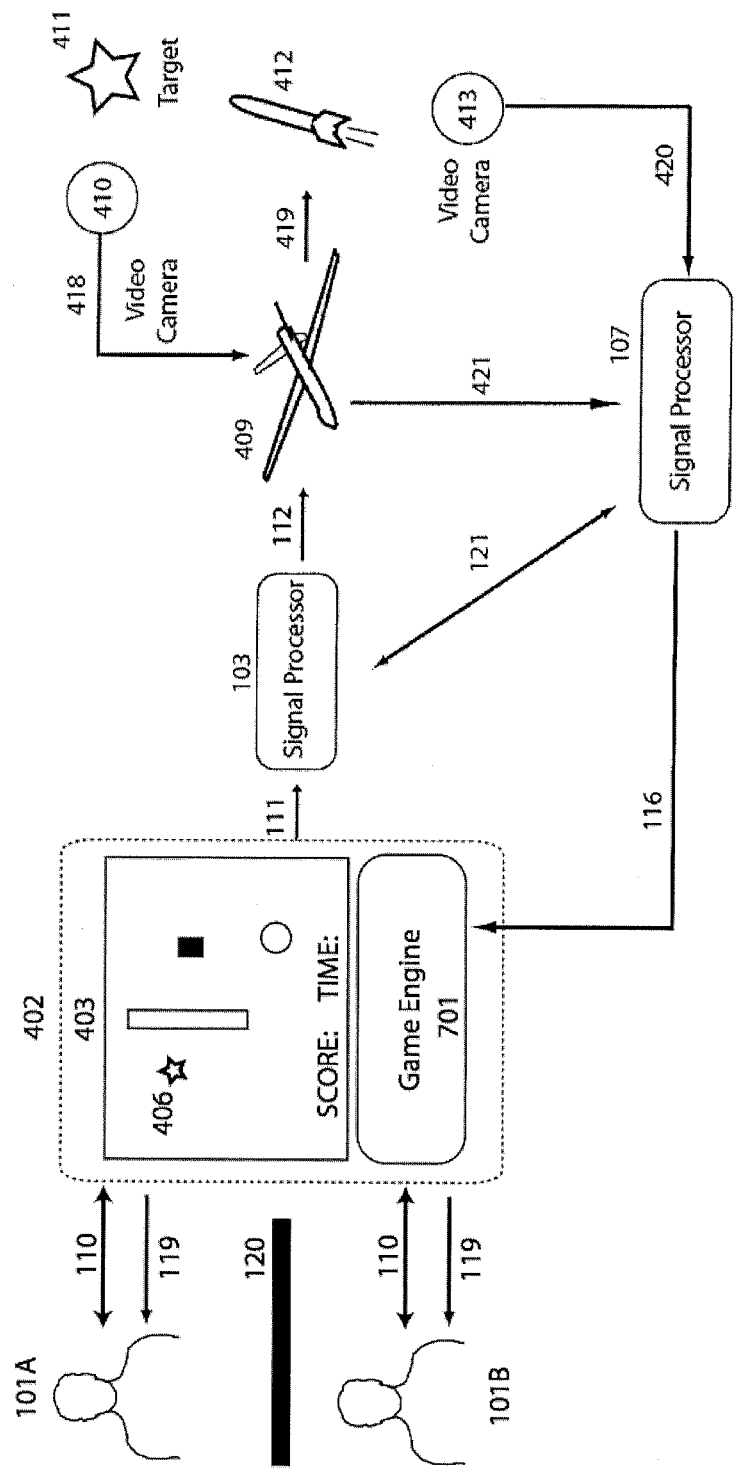
FIG. 7 depicts an exemplary high-level architecture in which an interaction mediator is used as an interface between one or more video games and a signal processor.

As another example of a variation on how the technology disclosed herein could be implemented, consider the architecture shown in FIG. 7, in which an interaction mediator [701] is implemented as part of an engine which allows one or more video games [402] to create interaction signals [111] and receive output signals [116] in a standard format. These standard format signals could then be translated into control signals (in the case of standard format interaction signals) or characteristic feedback for the video games (in the case of standard format output signals) without requiring game specific transformation, mapping and/or logic operations to be used to configure the signal processors [103][107].

An interaction mediator [701] which could be used to support such signals could be integrated into a game engine, for example, as a function or group of functions (e.g., stored in a library which is statically linked to the game engine when it is compiled, or which is dynamically linked to the game engine at run time) called or otherwise activated by the game engine. Once activated, such functions could generate interaction signals [117], for example, by accessing variables and other data maintained by the game engine to gather data needed for the creation of the interaction signals. Similarly, such functions could be called by the game engine (or be exposed to an external process which could call them via an API of the game engine) upon receipt of standard format output signals, and could then perform appropriate mapping, translation and/or logic operations on the standard format interaction signals to allow them to be used by the game engine to provide feedback [119] to the user.

It should be understood that use of an interaction mediator [701] integrated with a game engine is not necessary to support the production and consumption of standard format interaction and output signals. For example, an interaction mediator [701] could be implemented as a standalone process which could expose an API which a game engine (or other process) could invoke to provide the interaction mediator [701] with the information needed to create the standard format interaction signals, and which could use an API exposed by a game engine to cause the game engine to provide characteristic feedback [119] based on standard format output signals [116] after those signals had been subjected to the appropriate transformation, logic and/or mapping operations. Other ways of allowing an interaction mediator [701] to interact and exchange data with a game engine (e.g., through use of a shared memory space) could also be used, and so the description of the API-mediated interaction set forth above should be understood as being illustrative only, and should not be treated as limiting.

Variations on this architecture are also possible. For example, an interaction mediator [701] could be used in situations where no game engine is present (e.g., where the device or devices interacted with by the user or users are devices such as musical instruments, and are not interacted with via the playing of video games). Similarly, standard format interaction and/or output signals could be used or consumed in cases where no interaction mediator [701] is present (e.g., a device interacted with by a user could include a processor which is hard wired to generate standard format interaction signals, and to consume standard format output signals). Accordingly, while this discussion focuses on cases where an interaction mediator [701] is present and integrated with a game engine, it should be understood that this discussion is intended to be illustrative only, and should not be treated as being limiting.

Turning now to a concrete example of how standard format interaction and output signals could be used in practice, consider the case where a user is allowed to interact with a first device by playing one or more video games, which games include two flight simulators and a driving simulator. To illustrate how standard format interaction signals could be generated which reflect the user's interactions in a game-agnostic manner, assume that the flight simulators use the same controls to move a virtual aircraft left or right (e.g., when the user moves a joystick to the left, the virtual aircraft moves to the left, while when the user moves the joystick to the right, the virtual aircraft moves to the right), but use different controls to move the virtual aircraft up and down. For instance, the first flight simulator could cause the user's virtual aircraft to move up when the user moves the joystick forward and down when the user moves the joystick backward (reflecting the common practice in video games to treat forward as interchangeable with up and backward as interchangeable with down), while the second flight simulator could cause the user's virtual aircraft to move down when the user moves the joystick forward and up when the user moves the joystick backward (reflecting the fact that, in an actual aircraft, pushing a control column forward will make the aircraft tip its nose down, while pulling the control column back will make the aircraft tip its nose up). Also, assume that, in the driving simulator, the user could cause a virtual automobile to turn left or right by manipulating a joystick, or to accelerate or decelerate by pressing corresponding buttons on a keypad.

To allow the different control schemes described in the previous paragraph to be used to generate a standard format interaction signals, an interaction configuration file could be created which would identify specific data from the user's interaction with the video game (or from the video game itself), and which would identify how that data should be mapped to a standard format output signal [111] which a signal processor [103] could use to create appropriate control signals [112] for a device to be controlled. An example of the data which could be included in such a configuration file is set forth (in human readable format) below in table 1.

TABLE 1

Exemplary mapping information.

| Flight Simulator 1 | |
|---|---|
| Joystick forward → | Up |
| Joystick backward → | Down |
| Joystick left → | Left |
| Joystick right → | Right |
| Flight Simulator 2 | |
| Joystick backward → | Up |
| Joystick forward → | Down |
| Joystick left → | Left |
| Joystick right → | Right |
| Driving Simulator | |
| Button 1 [accelerate] → | Up |
| Button 2 [decelerate] → | Down |
| Joystick left → | Left |
| Joystick right → | Right |

This same type of approach could also be used to generate characteristic feedback [119] for a plurality of video games from standard format output signals [116] which are generated in a video game agnostic manner. To illustrate, consider how data [421] from a remotely controlled aircraft [409] identifying turbulence (e.g., gathered using an onboard LIDAR system on the remotely controlled aircraft [409]) could be used to generate characteristic output [119] for flight and driving simulators such as described above. For example, rather than being configured to generate a game specific output signal [116] which would be used to generate the feedback [119] to be provided by a particular video game, a signal processor [107] could be configured to generate a standard format output signal [116] representing the detected turbulence as an area of instability defined by a three dimensional bounding box. This standard format output signal [116] could then be sent to an interaction mediator [701] which would perform the appropriate operations to allow it to be used to provide the appropriate game-specific feedback [119] to the user.

As will be apparent to those of ordinary skill in the art, the actions required to generate a characteristic output [119] from a standard format output signal [116] would vary depending on the video game being interacted with by the user. To continue the example from the previous paragraph, if the first flight simulator represented turbulence by applying a red filter to areas of the game environment in or behind the turbulent area, while the second flight simulator represented turbulence by applying a distortion filter to areas of the game environment in or behind the turbulent area, then the interaction mediator [701] would use (or would cause the game engine to use, in implementations where the interaction mediator [701] is not included in the game engine) different filters to represent the turbulence in the environments of the different games. Similarly, if the first flight simulator simulated a modern jet fighter, while the second flight simulator simulated a World War I era biplane, the interaction mediator component [701] would preferably apply different mapping parameters to the coordinates of the turbulence so that the extent of the turbulence relative to the simulated aircraft in the game environments would be equivalent to the extent of the turbulence relative to the real remote control aircraft [409] in the real world (e.g., the absolute size of the turbulence presented in the first flight simulator could be greater than the absolute size of the turbulence presented in the second flight simulator to reflect that the time required to pass through a given area of turbulence would be much less for a modern jet fighter than for a World War I era biplane).

As a further example of how video game specific feedback [119] could be generated from standard format output signals [116], consider operations which could be performed to translate a standard format output signal [116] representing turbulence into characteristic output [119] for a driving simulator in which the user can accelerate and decelerate, and move to the left or right, but does not have the ability to move up or down. In such a case, an interaction mediator [701] could be configured to represent the turbulence as a section of rough terrain in the game environment (e.g., an oil slick, a section of gravel on a paved road, or a more abstract representation, such as an area of the ground covered in randomly moving, glowing arrows), where the length and width of the detected turbulence are reflected in the length and width of the rough terrain, and where the height of the detected turbulence is reflected in making the rough terrain velocity sensitive (e.g., by changing the depth of an oil slick, by changing the granularity or density of gravel on a paved road, by changing the lengths of the arrows in a section of ground covered in randomly moving, glowing arrows, etc). In this way, just as the remote controlled aircraft [409] could avoid turbulence by moving the left, or right or ascending or descending, the simulated automobile in the driving simulator could avoid the rough terrain by performing the equivalent movements (i.e., moving to the left or right, or speeding up or slowing down). As with the generation of standard format interaction signals, an interaction mediator [701] could be configured to support the consumption of standard format output signals [116] in a variety of manners, such as through a configuration file as described above, by hard coding the interaction mediator [701] for the particular video games which might be interacted with, or in other ways which will be immediately apparent to those of ordinary skill in the art in light of this disclosure.

Of course, the examples given above are intended to be illustrative of how users could be allowed engage in a variety of interaction types (e.g., interacting with a variety of video games) using standard format output and interaction signals, and are not intended to imply limitations on how this could take place. For example, while the discussion above focused on representing turbulence as an area of instability having a specific extent, it is possible that other characteristics of turbulence (e.g., intensity) could also be encoded in a standard format output signal [116] and represented in a characteristic output [119] (e.g., intensity of turbulence could be represented by the level of distortion or discoloration applied by a filter, or by varying the number of glowing arrows in an area of ground covered with glowing arrows, etc). Mappings to other types of feedback are also possible. To illustrate, table 2 provides examples of feedback which could be provided based on mappings from standard format output signals as described above.

TABLE 2

Exemplary feedback types and illustrations of how they could be incorporated into a video game embodiment.

| Feedback Type | Illustrative Examples |
| --- | --- |
| Haptic feedback | if an internal gyroscope in a remotely controlled aircraft detected the aircraft was vibrating, this could be reflected in causing a controller used by the user to vibrate, either in addition to, or as an alternative to, causing the simulated vehicle controlled by the user to move in a manner consistent with the vibrations. |
| Audio feedback | a signal from an internal stress sensor in a remotely controlled aircraft could be used to trigger the sound of metal rubbing against metal in a driving simulator or similar game. |
| Player position feedback | the position of an avatar or simulated vehicle controlled by a player could be modified to reflect movement of a remotely controlled device. |
| Target or goal position feedback | targets to be photographed by a surveillance drone could be mapped to entities to be shot in a video game (e.g., aliens in a space themed game, monsters in a fantasy themed game). |
| Obstacle position feedback | an obstacle to be avoided in the real world, such as a flock of birds which could damage a remote control aircraft, can be detected and mapped to obstacles in a game environment, such as a fruit stand in a driving simulator. |
| Time feedback | the user could be given a limited amount of playing time based on information such as power consumption and battery capacity of a remotely controlled aircraft, which time could be increased (or decreased) based on the efficiency of the remotely controlled aircraft when operated according to control signals based on the user's interactions. |
| Score feedback | certain types of activities could be defined as good (e.g., flying at an altitude low enough to evade radar detection systems) or bad (e.g., damaging a remotely controlled aircraft by colliding with objects such as birds), and the (un)desirability of these activities can be encoded in data |

TABLE 2-continued

Exemplary feedback types and illustrations of how they could be incorporated into a video game embodiment.

| Feedback Type | Illustrative Examples |
| --- | --- |
| | from a device being controlled and used to change a user's score. |

Accordingly, the discussion of turbulence set forth above should not be treated as implying that an interaction mediator [701] would necessarily be limited to mapping environmental phenomena like turbulence into a game environment.

Variations are also possible in the relationships between a user's interactions with a first device and actions performed by a device to be controlled (e.g., a remotely controlled aircraft [409]). For example, as will be immediately apparent to those of ordinary skill in the art, implementations of the disclosed technology which use device/game specific interaction and output signals, could be configured to support arbitrary relationships between user interactions and actions by (or data relating to) a remotely controlled device. These relationships include 1:many (e.g., where a single action by a user causes multiple actions by a device being controlled, or a single piece of data relating to a device being controlled triggers multiple items of feedback, such as actions in a video game played by a user), many:1 (e.g., where multiple actions by a user cause a single action by a device being controlled, or where multiple pieces of data relating to a device being controlled are represented as a single item of feedback for the user), many:many (where a first number of actions by a user trigger a second, potentially different, number of actions by a device being controlled, and vice versa), and many:0 (e.g., where a user's interactions with game elements generated by a game engine to provide entertainment are not used to generate control signals, or where extraneous data relating to a remotely controlled device is not used to generate output signals). While the examples above focused on 1:1 relationships between actions by (or feedback for) a user and standard format interaction (or output) signals, similar alternative relationships are also possible in implementations of the disclosed technology which use standard format interaction and/or output signals. Concrete examples types of how this could take place in practice are described below.

As a first concrete example of how the disclosed technology could allow a user's interactions to control a remote device, despite a lack of congruence between parameters to be controlled and user command types, consider a case where the number of command types a video game allows a user to provide exceeds the number of parameters to be controlled. This could be the case, for example, where a remotely controlled aircraft such as described above is controlled by a video game provides a user with the ability to control horizontal and vertical movement of a simulated character, and to contort the simulated character's body (e.g., by causing the simulated character to duck, or shift the orientation of his or her hips). In such a case, the disclosed technology could accommodate the difference in the number of command types and parameters to be controlled by simply mapping only a subset of the user commands (e.g., the horizontal and vertical movement commands) to the parameters to be controlled, and then only generating interaction signals (and, subsequently, control signals) in response to commands which are mapped to parameters in the device to be controlled.

The disclosed technology could also be used in cases where the number of command types to be provided by a user is less than the number of parameters to be controlled. To illustrate, consider the case of a video game which allows a user to control movement in two dimensions (e.g., moving a simulated sight of a firearm in a two dimensional representation of the shooter's field of view), while the device to be controlled is configured to receive control signals specifying movement in three dimensions (e.g., a quad copter which could move up, down, left, right, forward and back). In such a case, the difference in numbers of command types and parameters to be controlled could be accommodated by monitoring the activity of the user in the video game, and using information about that activity to generate interaction signals to supplement those which would be generated directly based on the user's commands. For example, in the case where a video game where the user controls placement of a simulated sight in a two dimensional representation of the shooter's field of vision, signals to control a quad copter's three dimensional movement can be generated by moving the quad copter left, right, forward and back based on the user's two dimensional movement commands, and causing the quad copter to move up and down based on the length of time the simulate sight overlaps one or more targets in the video game environment.

Other aspects of a video game, including aspects which are not under the direct control of a user, could also be used to generate interaction signals which would (after being transformed into control signals) control aspects of the operation of a remote device. For example, consider a case where a game engine (or interaction mediator) is configured to detect when the user reaches certain milestones, such as achieving a predetermined score or performance level. In such a case, a system implemented according to this disclosure could be configured to send an interaction signal [111] to a signal processor [103] upon achievement of the milestone, and the signal processor [103] could then use that interaction signal to generate a control signal [112] for the device being controlled which would cause the operation of the device being controlled to be modified in a manner appropriate for the user's demonstrated skill level. For example, if the device being controlled is a remotely controlled aircraft [409] a control signal [112] generated based on a user achieving a predetermined milestone could cause the remotely controlled aircraft to disengage a safety feature which, for a novice user, would function as a helpful protection against burning out the remotely controlled aircraft's engine, but, for an advanced user, would be an unnecessary impediment to the advanced user taking advantage of the remotely controlled aircraft's full capabilities in the appropriate situation.

To further illustrate potential variations on relationships between user interactions and actions in a device to be controlled, consider how the variability provided by customized mappings could be provided in a system which uses standard format signals. As will be immediately apparent to those of ordinary skill in the art, implementations of the disclosed technology which use device/game specific interaction and output signals, could be configured to support arbitrary relationships between user interactions and actions by (or data relating to) a remotely controlled device. These relationships include 1:many (e.g., where a single action by a user causes multiple actions by a device being controlled, or a single piece of data relating to a device being controlled triggers multiple items of feedback, such as actions in a video game played by a user), many:1 (e.g., where multiple actions by a user cause a single action by a device being controlled, or where multiple pieces of data relating to a device being controlled are represented as a single item of feedback for the user), many:many (where a first number of actions by a user trigger a second, potentially different, number of actions by a device being controlled, and vice versa), and many:0 (e.g., where a user's interactions with game elements generated by a game engine to provide entertainment are not used to generate control signals, or where extraneous data relating to a remotely controlled device is not used to generate output signals). While the examples above focused on 1:1 relationships between actions by (or feedback for) a user and standard format interaction (or output) signals, similar alternative relationships are also possible in implementations of the disclosed technology which use standard format interaction and/or output signals. Concrete examples of these types of how this could take place in practice are described below.

Perhaps the simplest example of how a non 1:1 relationship could be implemented in a system which uses standard format interaction and/or output signals is the case where multiple actions by a device to be controlled are necessary to implement a single command by a user. In this type of case, a single button press by a user at the appropriate time might result in a cascade of events, such as voltage changes equivalent to changes in the values of several potentiometers in the device being controlled. Similarly, if a video game [402] takes place in an environment in which a single directional command is sufficient to cause a simulated vehicle to move in a given direction indefinitely (e.g., outer space), but a device being controlled is located in an environment where movement will be maintained only with extended effort (e.g., under water), a single directional command by a user might result in an engine in the device being controlled being fired multiple times (e.g., based on an auto-pilot configured to maintain a constant velocity in the device being controlled, or based on multiple standard format interaction signals being created and used to generate control signals based on a single interaction by a user), thereby allowing the positions of the devices being controlled in the real and simulated environments to remain consistent.

The opposite situation, where multiple user interactions with a first device would result in a smaller number of actions (e.g., one) by the device to be controlled, is also possible. For example, in a highly interactive video game which may require a user to generate commands faster than the device to be controlled could implement them, or than the signal processor could process them, an interaction mediator [701] could be configured to sample those commands and only generate interaction signals [111] based on the sample, rather than based on every command. This type of sampling based approach could be implemented in various ways, such as sampling based on a fixed pattern (e.g., generating interaction signals based on every fourth command, or generating interaction signals only based on the first command issued by the user each second (or other time interval)), or random sampling (e.g., by storing commands in a fixed size buffer and randomly using commands in the buffer to generate interaction signals). Alternatively, rather than a sampling commands, an interaction mediator [701] could combine multiple commands. For example, where a user issues multiple directional commands in a short time, an interaction mediator [701] could combine those commands into a single vector which would be included in a standard format interaction signal [111].

An interaction mediator [701] could also be configured to support other techniques for allowing a single standard format interaction signal [111] to represent multiple commands from a user [101A]. For example, an interaction mediator [701] could be configured to monitor various parameters of a person or object controlled by a user [101A] in a video game [402] and generate interaction signals [111] when changes in those parameters exceeding pre-defined thresholds are detected, rather than on every command issued by the user [101A] to the video game [402]. To illustrate, consider a case where a remote controlled aircraft [409] having an autopilot capable of maintaining a constant velocity is controlled based on control signals [112] derived from a user's interactions [110] with a flight simulation video game [402] which requires the user [101A] to issue multiple commands to sustain movement in a given direction. In such a case, an interaction mediator [701] could be configured to monitor the velocity of the simulated aircraft in the flight simulation video game [402] and to only generate an interaction signal [111] when the velocity of the simulated aircraft changes by a threshold amount, rather than with every command issued by the user [101A]. This parameter monitoring approach could also be used in cases where this type of difference between the device the user is interacting with (e.g., a video game) and the device which is being controlled (e.g., the remote controlled aircraft) described above is not present. For example, where a remote controlled aircraft [409] and an entity being controlled in a video game would both require multiple commands to sustain movement in a given direction, an interaction mediator [701] could be configured to monitor for changes in the position of the entity being controlled in the video game [402], and to generate interaction signals [111] indicating directional commands only when the position of the entity being controlled changes by more than a threshold amount.

Parameter monitoring such as described above could also be used to generate multiple interaction signals based on a single command from a user. To illustrate, consider the example given previously where a game takes place in an environment in which a single directional command is sufficient to cause a simulated vehicle to move in a given direction indefinitely (e.g., outer space), but a device being controlled is located in an environment where movement will be maintained only with extended effort (e.g., under water). If the device being controlled would require multiple commands in order to maintain its movement, an interaction mediator [701] could be configured to monitor the velocity of the simulated vehicle and to periodically issue interaction signals with movement commands that would cause the positions of the devices being controlled in the real and simulated environments to remain consistent. In this manner, a user could achieve an objective in a game (e.g., moving from point A to point B) using whatever combination of activities he or she finds most entertaining/appropriate in the game situation (e.g., multiple hops, turns or adjustments, or a single directional command that results in sustained movement in the game environment), and the interaction mediator [701] would only provide the interaction signal (or signals) which is (or are) appropriate for achieving that same objective in the environment of the device being controlled.

These techniques could then be reversed to provide feedback having other than 1:1 relationships with items of data relating to the item to be controlled. For example, a single standard format output signal [116] indicating that a collision detector has fired on the device being controlled could trigger multiple pieces of feedback for a user (e.g., a crashing sound, sirens, a sudden jolt to the device being controlled by the user, etc). Similarly, monitoring a parameter of the device to be controlled (e.g., its position, as could be determined by a device mounted GPS receiver) could result in multiple changes in a video game being triggered based on only a single action (or smaller number of actions) by the device being controlled. For example, in a case where a video game simulates a vehicle with an auto-pilot which maintains a constant speed in an environment with a high resistance to movement, and the device being controlled is operating in an environment with a relatively lower resistance to movement, the feedback [119] provided to the user may include graphics indicating that the simulated auto-pilot has actuated an engine multiple times (e.g., gasses exiting the rear of a jet engine) even though the engine on the device being controlled had only been activated a single time (or a smaller number of times).

A user of a video game in an implementation which uses standard format interaction and output signals could also be presented with, and allowed to interact with, game elements generated for the purpose of increasing enjoyment, rather than generated as feedback [119] generated based on a standard format output signal [116]. For example, many aspects of a user's interaction with a video game (e.g., background music, sound effects, scoring) may serve to make the user's video game experience more engaging, without ever being used to reflect standard format output signals [116] received by an interaction mediator [701]. It is also possible that, in some implementations, game elements could be used both to enhance enjoyment and to provide feedback [119] based on standard format output signals [116]. To illustrate, consider a situation where the device being controlled is a remote controlled aircraft [409] used for reconnaissance, and an interaction mediator [701] is configured to represent objects to be photographed by the remote controlled aircraft [409] as enemies to be shot in a video game [402]. In this type of situation, if the remotely controlled aircraft [409] does not encounter any objects to be photographed for an extended period of time (e.g., while it is in transit to the area where its targets can be expected to be found), or if the user does not provide any input for a set period (e.g., if 20 seconds pass without the user issuing a command to the video game) the game engine could automatically generate enemies to be shot, objects to be avoided, or weather changes requiring flight modifications so that the user's attention does not flag during this period.

Where the same types interactions could be triggered both by game elements (e.g., enemies to be shot) which are generated based on output signals regarding the device to be controlled and/or its environment, and by game elements which are generated to maintain a user's attention, an interaction mediator [701] could be configured to differentiate between these types of interactions and to only generate standard format interaction signals [111] based on interactions triggered by game elements which are used to provide information regarding the device to be controlled and/or its environment. This can be done, for example, using a game engine which represents interactions as events (e.g., an event could be something like a projectile shot by the player hitting an in game enemy), and configuring that game engine to only send events to the interaction mediator [701] if those events do not involve attention maintenance game play elements (e.g., the game engine could send an event to the interaction mediator [701] when a projectile shot by the player hits an in game enemy except if the in game enemy was generated to maintain the player's attention). In cases where it is not clear whether an event is generated based on a game play element which was generated to maintain a user's attention (e.g., if a projectile hits an enemy in a crowd of enemies, only some of which are generated to maintain the user's attention), a game engine could be given a default setting which would result in interactions being sent to the interaction mediator [701] unless they were unambiguously triggered by a game element generated to maintain attention (e.g., events triggered by elements generated to maintain attention could be given a lower interrupt priority than other types of game elements). In this way, even implementations using an interaction mediator [701] and game engine to generate and consume standard format interaction and output signals could maintain the user's attention while avoiding masking interactions which should be used to generate interaction signals for a device being controlled.

Of course, the discussion above of how a system following the architecture of FIG. 7 could accommodate interactions triggered by game elements generated to maintain attention and by game elements generated based on output signals related to the device being controlled and/or its environment, should be understood as being illustrative only, and should not be treated as limiting. As an example of a variation on the above approaches which could be used either as an alternative or a supplement to the features described above, consider how a system could be configured to accommodate generating standard format interaction signals based directly on user commands which could represent interactions with game elements triggered based on output signals or game elements generated to maintain the user's attention, rather than on resulting game engine events. In this type of a system, information could be maintained indicating types of commands which are associated with particular game play elements (e.g., a sharp change in direction could be associated with an obstacle in the path of the player, shooting a projectile could be associated with an in game enemy in the player's field of view, etc) and a system could be configured to use commands in generating interaction signals [111] (e.g., by sending the commands from a game engine to an interaction mediator [701]) only if those commands were not of a type associated with a game play element which had been generated to maintain the user's attention.

As another example of a variation which could be implemented based on this disclosure, in some cases (e.g., where the cost of an improperly generated control signal is high, such as might be the case in a military situation, or if the control signals are used to deploy expensive equipment), it might be desirable for an interaction mediator [701] to generate standard format interaction signals [111] only based on interactions (either events, or commands, or both) which are unambiguously triggered based on an output signal relating to the device being controlled or its environment. In these types of cases, rather than treating the creation of interaction signals based on user interactions as a default, a system implemented according to this disclosure could be configured to generate interaction signals only if it was clear that those signals were triggered by game elements generated based on an output signal based on data relating to the device being controlled or its environment. Combined approaches may also be used. For example, a system implemented according to this disclosure could be configured to generate interactions signals from low cost/risk interactions (e.g., movement commands) unless the interactions were unambiguously triggered by game elements generated to maintain attention, and to generate interaction signals from high cost/risk interactions (e.g., firing a weapon) only if the interactions were unambiguously triggered by game elements generated based on output signals relating to a device being controlled or its environment. Accordingly, the discussion above should be understood as being illustrative only, and should not be treated as being limiting on the protection accorded by this document or any related document.

Variations are also possible in the underlying technical or physical implementation of systems including a game engine and integrated interaction mediator [701] as described above. For example, in a preferred embodiment a game engine incorporating an interaction mediator [701] could be implemented as software developed in the Processing language running on a computer with a serial wireless connection to an Arduino-compatible microcontroller, such as an Arduino Mega ADK or a Digilent chipKit Max32 that serves a signal processor [103]. In this type of embodiment, a user could interact with a game [402] using a cordless Logitech Rumblepad 2 handheld controller and view the results of their interactions on a monitor [403], potentially supplemented with sounds from the computer and haptic feedback through the controller. However, in another type of preferred embodiment, the game engine could comprise Python code and a Python code library executing on a Raspberry Pi single-board computer. A second Raspberry Pi single-board computer could then be used as a signal processor [103]. As with the previous type of embodiment, in this type of embodiment, users could interact with the game [402] using a Logitech handheld controller and view the results of their interactions on the microcomputer's monitor [403], potentially supplemented with sounds from the computer and haptic feedback through the controller.

Of course, other types of hardware and/or software could also be used. For example, an interaction mediator [701] (whether integrated into a game engine as shown in FIG. 7, or operating separately, as might be more appropriate in different scenarios) could also execute on devices such as laptops, desktops, tablets, smartphones, or wearable computers, and might be implemented as software, hardware, firmware, as combinations of the above. Other types of controllers than the Logitech Rumblepad 2 could also be integrated, such as a keyboard, a mouse, a joystick, a touch screen, a physiologic sensor, or a gesture recognition device. Similarly, rather than being used to control a remote controlled aircraft [409] standard format interaction signals could also be used to control other devices, such as remote surgical robots. In such a case, the interaction mediator's [701] standard format interaction signals [111] could be used to generate control signals [112] which could control the position and operation of a scalpel, clamp, or other effector on the remote control robot, such as could be used to surgically excise or repair tissue, administer medications, ultrasound, light, RF energy, or otherwise treat the medical target area or use the medical target area as a point of access into the body or bloodstream. Similarly, data gathered by sensors on or around the remote control robot, such as obstacle sensors, target sensors and environment sensors could be used to generate standard format output signals [116] which the interaction mediator [701] could use to provide feedback to the user. Other variations are also possible, and will be immediately apparent to those of ordinary skill in the art in light of this disclosure. Accordingly, the discussion of how particular preferred embodiments could be implemented should be understood as being illustrative only, and not be treated as limiting on the scope of protection provided by this document or any related document.

In addition to the obvious benefit of reducing the need to reconfigure, or manufacture new versions of, signal processors, use of standard format interaction and output signals such as described above can also have the benefit of automatically identifying which games, from a library of games configured to operate with standard format interaction and output signals, are appropriate for use in controlling a particular remote device. This could be achieved, by starting with a library of games (e.g., first-person shooters, simulations, strategy/tactic games, sports games, fighting games, dance/rhythm games, hybrids, etc) which had been configured to generate standard format interaction signals, and to process standard format output signals, then filtering them based on the individual games' capacity to generate and process signals at a density which is sufficient for the device to be controlled (e.g., as might be specified in a configuration file corresponding to the device to be controlled). For example, if a device to be controlled could be expected to require new commands every few seconds in order to avoid a collision (or other negative outcome), then games which require a user to provide commands much more infrequently (e.g., a turn based strategy game which might require the user to provide only a few commands per minute, or a command every few minutes) could be filtered out. Similarly, if the device to be controlled could be expected to encounter an obstacle (or for some other event to take place which would require feedback to be provided to the user so that he or she could take appropriate action) every few seconds, then a game which would provide feedback much less frequently could be filtered out as well. Other types of filtering are also possible. For example, a game could be filtered if no mapping existed between the interaction signals from the game and the control signals for the device to be controlled, or if no mapping existed between the data which would be provided by sensors located on the device to be controlled or its environment and output signals for the game.

As an alternative (or supplement) to filtering, some implementations might allow users to select games to play even if those games are not able to provide all interaction signals necessary for the device to be controlled, or process all output signals which would be necessary to reflect the data relating to the device and/or its environment. For example, if a remotely controlled aircraft [409] required control signals [112] specifying both direction of movement and whether to interact with a target, a pair of users [101A][101B] might be allowed to select video games which were individually insufficient to fully specify the required control signals [112] (e.g., a first video game whose interaction signals [111] were mapped to the directional component of the control signals [112], and a second video game whose interaction signals [111] were mapped to the target interaction component of the control signals [112]). The interaction signals [111] from the two selected video games could then be combined to fully specify the control signals [112] for the remote controlled aircraft [409] (e.g., by both games executing based on a single instance of the game engine, by the games executing on independent game engines and sending their interaction signals [111] to a single signal processor [103], etc).

Interaction signals generated based on actions of multiple users could also be used to control aspects of devices other than remotely controlled aircraft [409]. For example, in an implementation where the device being controlled is a surgical robot, one user's interactions could be used to control a clamp on the remote surgical robot, while another user's interactions could be used to control a scalpel. Other types of devices, including, but not limited to, other types of vehicles, manufacturing machinery, security systems, and other types of medical devices, could also be remotely controlled using this type of approach (or the single user approaches described previously). Accordingly, the discussion above should be understood as being illustrative only of how this type of approach could be used as an alternative to filtering, and should not be treated as limiting.

Of course, the discussion above, which explained how games from a library of games configured to operate with standard format interaction and output signals could be automatically filtered based on the requirements of a device to be controlled, should not be treated as implying that such filtering is only possible in implementations of the disclosed technology which operate with standard format interaction and output signals. For example, in cases where no standard format signals are used, and custom mappings are created between each game and each device which would be controlled, filtering could take place by filtering out games from a pre-existing library for which mappings to a particular device to be controlled had not been created. Combinations are also possible. For example, a system could be implemented to allow a game to use either standard format signals or custom signals (e.g., if standard format signals could not communicate sufficient information to allow a particular game to control a type of device), and filtering could take place based on whether the game could control and receive input from a particular device using either standard format or custom signals. Filtering could also be performed based on non-mapping considerations. For example, if a library of games is provided by a cloud based game service through links (or other mechanisms, such as a radio selector or drop down menu) in an interface provided by a browser or specialized client program, then what games a user would be allowed to access could be determined at least in part based on what type of access the user had purchased from the service.

Non-mapping considerations could also be incorporated into other aspects of the functionality of a system implemented using the disclosed technology. For example, a game engine, whether or not configured to allow games to utilize standard format interaction and/or output signals, could allow users of the games to customize their game play experience, such as by modifying preferences (e.g., responsiveness of controls, right or left handed button configurations, etc). These preferences could then be stored (e.g., along with game play elements such as a user's score or in-game accomplishments) so that a user's experience could be consistent across games and across gaming sessions, even if the user was only one of many executing games off of a single instance of a game engine (as might be the case when a game is accessed via a cloud based game service, where player specific information such as preferences could be associated with a user's unique login ID). Accordingly, the discussion above should be understood as being illustrative only, and should not be treated as limiting on the protection provided by this document, or by any related document.

Given that the disclosure herein is intended to be illustrative only, and not an exhaustive listing of all possible embodiments of the technology created by the inventor, the protection provided by this document should not be limited to the material explicitly disclosed. Instead, such protection should be understood to be defined by the claims, when the terms in those claims which are explicitly defined under the "Explicit Definitions" heading are given their explicit definitions, and when all other terms are given their broadest reasonable interpretation as shown by a general purpose dictionary. To the extent that the interpretation which would be given to the claims based on the above disclosure is in any way narrower than the interpretation which would be given based on the explicit definitions under the "Explicit Definitions" heading and the broadest reasonable interpretation as provided by a general purpose dictionary, the interpretation provided by the explicit definitions under the "Explicit Definitions" heading and broadest reasonable interpretation as provided by a general purpose dictionary shall control, and the inconsistent usage of terms in the specification shall have no effect.

EXPLICIT DEFINITIONS

When used in the claims, "based on" should be understood to mean that something is determined at least in part by the thing that it is indicated as being "based on." When something is completely determined by a thing, it will be described as being "based EXCLUSIVELY on" the thing.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, the phrase "control signal" should be understood to refer to a signal which is used to direct the operation of a device or machine.

When used in the claims, the term "device" should be understood to refer to a real, virtual, or mixed reality object, mechanical and/or electronic system.

When used in the claims, the phrase "interaction signal" should be understood to refer to a signal indicating a user's operation of some thing (i.e., the interaction).

When used in the claims, "mapping" should be understood to refer to the linking of variables or parameters into a second set of variables or parameters, for example, the linking of inputs from one system or device(s) to those of another system or device(s). "Mapping" may be one-to-one, one-to-many, and many-to-one. "Mapping" may apply to, but is not limited to: gestures (e.g., hand and other body movements); physiologic variables (e.g., pulse, respiration, body weight, breathing rate, hematocrit, and blood pressure); physical variables (e.g., color, length, voltage, height, mass, velocity, rotation, sound pressure, force); protein sequences (e.g., DNA and RNA sequences); emotion (e.g., anger, mania, and depression); and patterns (e.g., music, physiologic rhythms, still images, and video images).

When used in the claims, the term "processor" should be understood to refer to a device or group of devices capable of performing one or more logical and/or physical operations on data to produce a result. A processor may include, for example, a single-core or multi-core microcontroller or microcomputer, configured as an embedded processor or as a part of a mobile, portable, wearable, or desktop computer.

When used in the claims, a "signal" should be understood as an indicator, such as pulses of light or a modulated electric current which can convey information between devices or components of a single device.

When used in the claims, "signal processor" should be understood to refer to a device or collection of devices which is configured to perform "signal processing" on an input.

When used in the claims, "video game" should be understood to mean a computer application that involves human interaction with a user interface to generate feedback, including at least video feedback. The user interface may include, for example, a joystick, haptic game controller, tilt and angular velocity detector, touch-screen, body and hand gestures, video camera, ultrasonic or IR rangefinder, eye motion/position detector, and voice recognition.

When used in the claims, "video game engine" should be understood to mean the software and/or firmware responsible for the delivery of video games.

Accordingly, I claim:

1. A system comprising:
   a. a first device configured to allow a first user to provide commands to a first video game and further configured to allow the first user to receive feedback characteristic of the first video game;
   b. a first signal processor configured to generate control signals based on interaction signals indicative of interactions between the first user and the first video game;
   c. a second device configured to receive, and to operate according to, the control signals;
   d. a second signal processor configured to determine output signals by performing one or more of translation, mapping and logic operations on operation signals indicative of operation of the second device according to the control signals, and further configured to send the output signals to the first device;
   e. a transducer operable to provide the feedback characteristic of the first video game; and
   f. a game database storing a library of video games, the library of video games comprising the first video game;
   wherein:
   A. the first device is further configured by a first set of instructions operable, when executed, to determine game elements included in the feedback characteristic of the first video game based on the output signals from the second signal processor;
   B. the first device is further configured by a second set of instructions operable, when executed, to determine game elements included in the feedback characteristic of the first video game not based on the output signals from the second processor;
   C. the first device is further configured to allow the first user to select a video game from the library of video games;
   D. the first device is further configured to constrain the first user's selection from the library of video games by filtering the library of video games based on the existence of data allowing control signals for the second device to be generated based on interactions between the first user and the video games from the library of video games;
   E. the first device is further configured to distinguish between:
      i. interactions with game elements determined based on output signals from the second signal processor; and
      ii. interactions with game elements determined not based on output signals from the second signal processor; and
   F. the first device is further configured to determine whether to generate interaction signals indicative of interactions between the first user and the first video game based on whether those interactions are with game elements determined based on output signals from the second signal processor.

2. The system of claim 1, wherein:
   a. the first device comprises a plurality of servers organized into a cluster;
   b. the first device is configured to allow the first user to select a video game from the library of video games by selecting from a plurality of links representing the video games in the library, wherein the plurality of links is presented by a browser displayed by a computer proximate to the first user.

3. The system of claim 1, wherein:
   a. the first device is further configured to allow a second user to provide commands to a second video game; and
   b. the first signal processor is configured to generate the control signals based on interaction signals indicative of interactions between the first user and the first video game and further based on interaction signals indicative of interactions between the second user and the second video game.

4. The system of claim 3, wherein the first device is further configured to:
   a. allow the first user to define preference information for the first video game;

b. allow the first user to provide commands to, and receive feedback from, the first video game using the preference information defined by the first user for the first video game;
c. allow the second user to define preference information for the second video game; and
d. allow the second user to provide commands to, and receive feedback from, the second video game using the preference information defined by the second user for the second video game.

5. The system of claim 4, wherein:
a. the system further comprises a library of video games, the library of video games comprising the first video game; and
b. the first device is configured to automatically apply the preference information defined by the first user for the first video game when the user plays at least one other video game from the library of video games.

6. The system of claim 3, wherein:
a. the first and second video games are different video games;
b. the first device is configured to generate the interaction signals indicative of interactions between the first user and the first video game, and is further configured to generate the interaction signals indicative of interactions between the first user and the first video game in a standard format; and
c. the first device is configured to generate the interaction signals indicative of interactions between the second user and the second video game, and is further configured to generate the interaction signals indicative of interactions between the second user and the second video game in the standard format.

7. The system of claim 3 wherein:
a. the first video game and the second video games are different video games;
b. the first device is configured to determine game elements included in the feedback characteristic of the first video game based on output signals encoded using a standard format; and
c. the first device is configured to determine game elements included in the feedback characteristic of the second video game based on output signals encoded using the standard format.

8. The system of claim 1, wherein the first device comprises a non-transitory computer readable medium storing a game engine operable to cause the first device to execute the first set of instructions and the second set of instructions.

9. The system of claim 8, wherein the first set of instructions and the second set of instructions are both comprised by the game engine.

10. A method comprising:
a. at a first device, generating an interaction signal indicative of an interaction between a first user and a first video game played by the first user, wherein the first video game played by the first user is comprised in a library of video games;
b. at a first signal processor, generating a control signal based on the interaction signal indicative of the interaction between the first user and the first video game played by the first user;
d. sending the control signal generated by the first signal processor to a second device;
e. at a second signal processor, generating an output signal based on an operation signal indicative of operation of the second device based on the control signal, and sending the output signal to the first device, wherein generating the output signal comprises performing one or more of mapping, translation and logic operations on the operation signal;
f. at the first device, determining a first game element based on the output signal generated by the second signal processor to present to the first user via the first video game played by the first user;
g. at the first device, determining a second game element not based on the output signal generated by the second signal processor to present to the first user via the first video game played by the first user;
h. presenting the first and second game elements to the first user;
i. determining one or more video games from the library of video games to present to the first user for possible selection by filtering the library of video games based on the existence of data allowing control signals for the second device to be generated based on interactions between the first user and the video games from the library of video games;
j. allowing the first user to make a selection from the determined one or more video games;
k. at the first device, distinguishing between:
A. interactions with game elements determined based on output signals from the second signal processor; and
B. interactions with game elements determined not based on output signals from the second signal processor; and
l. at the first device, determining whether to generate interact signals indicative of interactions between the first user and the first video game based on whether those interactions are with the game elements determined based on output signals from the second signal processor.

11. The method of claim 10, wherein:
a. the first game element and the second game element have a single type which is the same for both the first game element and the second game element;
b. the method further comprises receiving a command from the first user; and
c. determining whether to generate an interaction signal indicative of the command from the first user based on determining whether the command was a command for an interaction with the first game element or whether the command a command for an interaction with the second game element.

12. The method of claim 10, wherein the first device comprises a plurality of servers organized into a cluster by a cloud based gaming service.

13. The method of claim 10, further comprising:
a. at the first device, generating an interaction signal indicative of an interaction between a second user and a second video game played by the second user;
b. at the first signal processor, generating a second control signal based on the interaction signal indicative of the interaction between the second user and the second video game; and
c. sending the second control signal generated by the first signal processor to the second device.

14. The method of claim 13, wherein:
a. the first video game played by the first user and the second video game played by the second user are different video games;
b. generating the interaction signal indicative of the interaction between the first user and the first video game played by the first user comprises generating the interaction signal indicative of the interaction between the first user and the first video game played by the first user in a standard format; and
b. generating the interaction signal indicative of the interaction between the second user and the second video game played by the second user comprises generating the interaction signal indicative of the interaction between the second user and the second video game played by the second user in the standard format.

15. The method of claim 13, further comprising:
a. allowing the first user to define a set of first user specific preference information;
b. allowing the second user to define a set of second user specific preference information;
c. at the first device, applying the set of first user specific preference information to the interaction between the first user and the first video game played by the first user, and applying the set of second user specific preference information to the interaction between the second user and the second video game played by the second user.

16. The method of claim 10 wherein generating the interaction signal indicative of the interaction between the first user and the first video game played by the first user comprises monitoring a parameter of an entity controlled by the first user in the first video game and generating the interaction signal indicative of the interaction between the first user and the first video game based on changes in the monitored parameter.

17. A method comprising:
a. at a first device, generating an interaction signal indicative of an interaction between a first user and a first video game played by the first user;
b. at a first signal processor, generating a control signal based on the interaction signal indicative of the interaction between the first user and the first video game played by the first user;
d. sending the control signal generated by the first signal processor to a second device;
e. at a second signal processor, generating an output signal based on an operation signal indicative of operation of the second device based on the control signal, and sending the output signal to the first device, wherein generating the output signal comprises performing one or more of mapping, translation and logic operations on the operation signal;
f. at the first device, determining a first game element based on the output signal generated by the second signal processor to present to the first user via the first video game played by the first user;
g. at the first device, determining a second game element not based on the output signal generated by the second signal processor to present to the first user via the first video game played by the first user; and
h. presenting the first and second game elements to the first user;

wherein the first game element and the second game element have a single type which is the same for both the first game element and the second game element, and wherein the first device is configured to determine that the second game element should be presented to the first user based on a threshold period passing without any game elements of the type of the second game element having been presented to the user.

* * * * *